United States Patent
Arndt et al.

(10) Patent No.: US 11,074,205 B2
(45) Date of Patent: *Jul. 27, 2021

(54) MANAGING EFFICIENT SELECTION OF A PARTICULAR PROCESSOR THREAD FOR HANDLING AN INTERRUPT

(71) Applicant: INTERNATIONAL BUSINESS MACHINES CORPORATION, Armonk, NY (US)

(72) Inventors: Richard L. Arndt, Austin, TX (US); Florian Auernhammer, Rueschlikon (CH); Wayne M. Barrett, Rochester, MN (US); Robert A. Drehmel, Goodhue, MN (US); Guy L. Guthrie, Austin, TX (US); Michael S. Siegel, Austin, TX (US); William J. Starke, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/540,053

(22) Filed: Aug. 14, 2019

(65) Prior Publication Data

US 2019/0370198 A1 Dec. 5, 2019

Related U.S. Application Data

(63) Continuation of application No. 15/792,755, filed on Oct. 25, 2017, now Pat. No. 10,423,550.

(51) Int. Cl.
*G06F 13/24* (2006.01)
*G06F 13/366* (2006.01)
(Continued)

(52) U.S. Cl.
CPC ............ *G06F 13/24* (2013.01); *G06F 9/3836* (2013.01); *G06F 13/366* (2013.01);
(Continued)

(58) Field of Classification Search
CPC ....... G06F 13/24; G06F 9/4812; G06F 9/5027
(Continued)

(56) References Cited

U.S. PATENT DOCUMENTS

| 3,665,404 A | 5/1972 | Werner et al. |
| 5,386,511 A | 1/1995 | Murata et al. |

(Continued)

OTHER PUBLICATIONS

Quintero et al, "IBM Power Systems 775 for AIX and Linux HPC Solution", International Business Machines Corporation, Oct. 2012, accessed online from IBM.com/redbooks, 358 pages.

(Continued)

*Primary Examiner* — Faisal M Zaman
(74) *Attorney, Agent, or Firm* — Bryan Bortnick; Amy J. Pattillo

(57) ABSTRACT

A snooper of a processing unit connected to processing units via a system fabric receives a first single bus command in a bus protocol that allows sampling over the system fabric of the capability of snoopers to handle an interrupt and returns a first response indicating the capability of the snooper to handle the interrupt. The snooper, in response to receiving a second single bus command in the bus protocol to poll a first selection of snoopers for an availability status to service a criteria specified in the second single bus command, returns a second response indicating the availability of the snooper to service the criteria. The snooper, in response to receiving a third single bus command in the bus protocol to direct the snooper to handle the interrupt, assigns the interrupt to a particular processor thread of a respective selection of the
(Continued)

one or more separate selections of processors threads distributed in the processing unit.

14 Claims, 10 Drawing Sheets

(51) Int. Cl.
    *G06F 9/38*     (2018.01)
    *G06F 13/42*     (2006.01)
    *G06F 13/40*     (2006.01)

(52) U.S. Cl.
    CPC .......... *G06F 13/4068* (2013.01); *G06F 13/42* (2013.01); *G06F 2213/2412* (2013.01); *G06F 2213/2414* (2013.01)

(58) Field of Classification Search
    USPC ................ 710/263, 264, 269, 260, 261, 262
    See application file for complete search history.

(56) References Cited

U.S. PATENT DOCUMENTS

| | | | |
|---|---|---|---|
| 5,555,420 | A | 9/1996 | Sarangdhar et al. |
| 5,659,708 | A | 8/1997 | Arimilli et al. |
| 5,892,956 | A | 4/1999 | Qureshi et al. |
| 5,978,874 | A | 11/1999 | Singhal et al. |
| 6,061,710 | A | 5/2000 | Eickemeyer et al. |
| 6,065,088 | A | 5/2000 | Bronson et al. |
| 6,606,676 | B1 | 8/2003 | Deshpande et al. |
| 7,143,246 | B2 | 11/2006 | Johns |
| 9,792,232 | B2 | 10/2017 | Arndt et al. |
| 10,423,550 | B2 * | 9/2019 | Arndt ...................... G06F 13/42 |
| 2002/0166018 | A1 | 11/2002 | Kim et al. |
| 2004/0236879 | A1 * | 11/2004 | Croxford ................ G06F 13/24 710/48 |
| 2005/0228918 | A1 * | 10/2005 | Kriegel ................... G06F 13/24 710/260 |
| 2007/0067533 | A1 * | 3/2007 | So ........................... G06F 13/24 710/260 |
| 2008/0288828 | A1 | 11/2008 | Baker et al. |
| 2009/0217019 | A1 * | 8/2009 | Gross ..................... G06F 3/3885 712/244 |
| 2009/0228625 | A1 * | 9/2009 | Kulkarni ................ G06F 9/505 710/263 |
| 2010/0077399 | A1 * | 3/2010 | Plondke ................ G06F 9/4818 718/103 |
| 2010/0082867 | A1 * | 4/2010 | Adachi ................... G06F 13/26 710/261 |
| 2011/0087815 | A1 | 4/2011 | Kruglick et al. |
| 2011/0106995 | A1 | 5/2011 | Gopalakrishnan et al. |
| 2014/0006666 | A1 * | 1/2014 | Hiraki ..................... G06F 13/24 710/260 |
| 2014/0108691 | A1 * | 4/2014 | Kennedy ................ G06F 13/24 710/269 |
| 2014/0122339 | A1 | 4/2014 | Safranek et al. |
| 2014/0122759 | A1 | 5/2014 | Machnicki et al. |
| 2014/0189701 | A1 * | 7/2014 | Semin ..................... G06F 9/505 718/104 |
| 2015/0067217 | A1 * | 3/2015 | Feehrer ............... G06F 11/0709 710/263 |
| 2015/0178239 | A1 | 6/2015 | Guthrie et al. |
| 2015/0356036 | A1 * | 12/2015 | Feehrer ................... G06F 13/16 710/263 |
| 2015/0378941 | A1 * | 12/2015 | Rozas ..................... G06F 21/00 710/267 |
| 2016/0011996 | A1 | 1/2016 | Assad et al. |
| 2016/0371208 | A1 | 12/2016 | Rosenberg et al. |
| 2017/0102954 | A1 | 4/2017 | Miyazaki et al. |
| 2017/0139862 | A1 * | 5/2017 | Arndt ................. G06F 13/4068 |
| 2017/0168853 | A1 | 6/2017 | Nampoothiri et al. |
| 2017/0286332 | A1 * | 10/2017 | Kotary ................... G06F 13/24 |
| 2017/0336988 | A1 | 11/2017 | Kim et al. |
| 2017/0364137 | A1 | 12/2017 | Gendler et al. |
| 2019/0121760 | A1 | 4/2019 | Arndt et al. |

OTHER PUBLICATIONS

Heiler, Barbara, "Coupling Thin Interrupts and Coupling Facility Performance in Shared Processor Environments", IBM Corporation, 2013, 37 pages.
Office Action, dated Oct. 1, 2018, U.S. Appl. No. 15/792,755, filed Oct. 25, 2017, in re Arndt, 15 pages.
Notice of Allowance, dated Feb. 8, 2019, U.S. Appl. No. 15/792,755, filed Oct. 25, 2017, in re Arndt, 6 pages.
Notice of Allowance, dated May 15, 2019, U.S. Appl. No. 15/792,755, filed Oct. 25, 2017, in re Arndt, 10 pages.
"List of IBM Patents or Patent Applications Treated as Related", dated Aug. 20, 2019, 2 pages.

* cited by examiner

MANAGING EFFICIENT SELECTION OF A PARTICULAR PROCESSOR THREAD FOR HANDLING AN INTERRUPT

BACKGROUND

1. Technical Field

One or more embodiments of the invention relate generally to data processing systems and more particularly to managing efficient selection of a particular processor thread for handling an interrupt from among multiple processor threads across one or more processing nodes connected by a system fabric.

2. Description of the Related Art

In data processing systems, an interrupt signal, also referred to as an interrupt, is generated to indicate to a processor that an event requires attention. Interrupt handling in processors is generally a time-consuming process that requires locating a processor thread available to handle an interrupt. Depending on a priority of an interrupt, a processor may respond to an interrupt by suspending current activities, saving state, and then executing a function to service the event, before resuming suspended activities.

BRIEF SUMMARY

In one embodiment, a method is directed to receiving, by a particular snooper of a particular processing unit of a plurality of processing units connected via a system fabric, a first single bus command in a bus protocol that allows sampling over the system fabric of the capability of a plurality of snoopers to handle an interrupt, wherein the first single bus command in the bus protocol called through an interrupt histogram command to sample the capability of the plurality of snoopers by requesting an age metric for a particular logical server identifier specified at a particular priority. The method is directed to, in response to receiving, by the particular snooper, the first single bus command in the bus protocol called through the interrupt histogram, returning, by the particular snooper, a first response indicating the capability of the particular snooper to handle the interrupt, wherein each of the plurality of processing units comprises a respective snooper from among the plurality of snoopers distributed across the plurality of processing units, wherein each respective snooper of the plurality of snoopers controls assignment of interrupts and dispatch of instructions to a separate selection of a plurality of physical processor threads connected to a plurality of cores distributed in each of the plurality of processing units, the first response comprising an acknowledge tag type, a plurality of bits comprising a poll vector, at least one bit identifying a preclusion status relative to the particular priority and at least one bit identifying a collision status, wherein the first response reflects an acknowledgement type from among a plurality of acknowledgement types indicating whether the particular snooper has the capability to handle the interrupt. The method is directed to, in response to receiving, by the particular snooper, a second single bus command in the bus protocol to poll a first selection of snoopers indicating capability, from among the plurality of snoopers, for an availability status to service a criteria specified in the second single bus command, returning, by the particular snooper, a second response indicating the availability of the particular snooper to service the criteria. The method is directed to, in response to receiving, by the particular snooper, a third single bus command in the bus protocol to direct the particular snooper to handle the interrupt, assigning, by the particular snooper, the interrupt to a particular processor thread of a respective selection of the separate selection of the plurality of physical processor threads distributed in the particular processing unit.

In another embodiment, a system comprises a particular processing unit, of a plurality of processing units connected via a system fabric. The system comprises the processing unit for receiving, by a particular snooper of the particular processing unit, a first single bus command in a bus protocol that allows sampling over the system fabric of the capability of a plurality of snoopers to handle an interrupt, wherein the first single bus command in the bus protocol called through an interrupt histogram command to sample the capability of the plurality of snoopers by requesting an age metric for a particular logical server identifier specified at a particular priority. The system comprises the processing unit, in response to receiving, by the particular snooper, the first single bus command in the bus protocol called through the interrupt histogram, for returning, by the particular snooper, a first response indicating the capability of the particular snooper to handle the interrupt, wherein each of the plurality of processing units comprises a respective snooper from among the plurality of snoopers distributed across the plurality of processing units, wherein each respective snooper of the plurality of snoopers controls assignment of interrupts and dispatch of instructions to a separate selection of a plurality of physical processor threads connected to a plurality of cores distributed in each of the plurality of processing units, the first response comprising an acknowledge tag type, a plurality of bits comprising a poll vector, at least one bit identifying a preclusion status relative to the particular priority and at least one bit identifying a collision status, wherein the first response reflects an acknowledgement type from among a plurality of acknowledgement types indicating whether the particular snooper has the capability to handle the interrupt. The system comprises the processing unit, in response to receiving, by the particular snooper, a second single bus command in the bus protocol to poll a first selection of snoopers indicating capability, from among the plurality of snoopers, for an availability status to service a criteria specified in the second single bus command, for returning, by the particular snooper, a second response indicating the availability of the particular snooper to service the criteria. The system comprises the processing unit, in response to receiving, by the particular snooper, a third single bus command in the bus protocol to direct the particular snooper to handle the interrupt, for assigning, by the particular snooper, the interrupt to a particular processor thread of a respective selection of the separate selection of the plurality of physical processor threads distributed in the particular processing unit.

In another embodiment, a computer program product comprises one or more computer-readable storage devices and program instructions, stored on at least one of the one or more storage devices. The stored program instructions comprise program instructions, to receive, by a particular snooper of a particular processing unit of a plurality of processing units connected via a system fabric, a first single bus command in a bus protocol that allows sampling over the system fabric of the capability of a plurality of snoopers to handle an interrupt, wherein the first single bus command in the bus protocol called through an interrupt histogram command to sample the capability of the plurality of snoopers by requesting an age metric for a particular logical server identifier specified at a particular priority. The stored program instructions comprise program instructions, in response to receiving, by the particular snooper, the first single bus command in the bus protocol called through the interrupt histogram, to return, by the particular snooper, a first response indicating the capability of the particular snooper to handle the interrupt, wherein each of the plurality of processing units comprises a respective snooper from among the plurality of snoopers distributed across the plurality of processing units, wherein each respective snooper of the plurality of snoopers controls assignment of interrupts and dispatch of instructions to a separate selection of a plurality of physical processor threads connected to a plurality of cores distributed in each of the plurality of processing units, the first response comprising an acknowledge tag type, a plurality of bits comprising a poll vector, at least one bit identifying a preclusion status relative to the particular priority and at least one bit identifying a collision status, wherein the first response reflects an acknowledgement type from among a plurality of acknowledgement types indicating whether the particular snooper has the capability to handle the interrupt. The stored program instructions comprise program instructions, in response to receiving, by the particular snooper, a second single bus command in the bus protocol to poll a first selection of snoopers indicating capability, from among the plurality of snoopers, for an availability status to service a criteria specified in the second single bus command, to return, by the particular snooper, a second response indicating the availability of the particular snooper to service the criteria. The stored program instructions comprise program instructions, in response to receiving, by the particular snooper, a third single bus command in the bus protocol to direct the particular snooper to handle the interrupt, to assign, by the particular snooper, the interrupt to a particular processor thread of a respective selection of the separate selection of the plurality of physical processor threads distributed in the particular processing unit.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
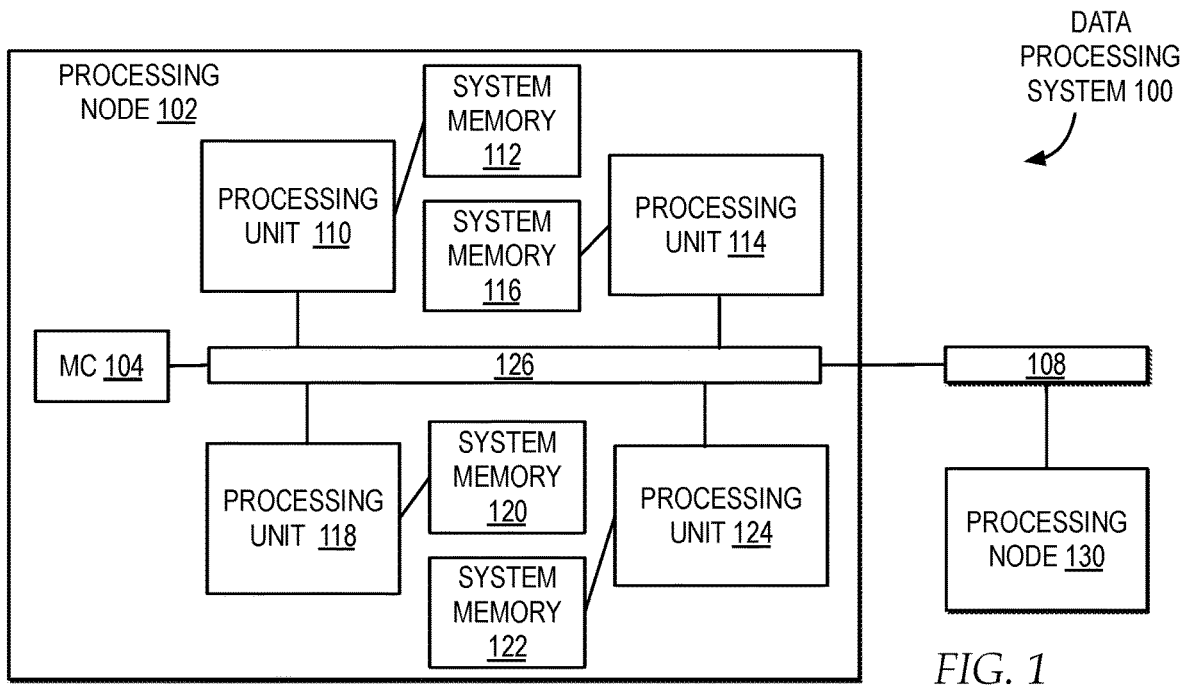
FIG. 1 illustrates a block diagram of one example of a data processing system implementing one or more processing nodes connected by a system fabric of one or more interconnects in which interrupts are managed in the system fabric through a bus protocol that determines the capability and availability of multiple processor threads to handle an interrupt by issuing a sequence of one or more single bus commands and assigning a single processor thread to the interrupt.

FIG. 1 illustrates a block diagram of one example of a data processing system implementing one or more processing nodes connected by a system fabric of one or more interconnects in which interrupts are managed in the system fabric through a bus protocol that determines the capability and availability of multiple processor threads to handle an interrupt by issuing a sequence of one or more single bus commands and assigning a single processor thread to the interrupt.

In one example, a data processing system 100 illustrates one example of a cache coherent symmetric multiprocessor (SMP) including multiple processing nodes for processing data and instructions, such as a processing node 102 and a processing node 130. In one example, processing node 102 and processing node 130 are coupled to a system interconnect 108 for conveying address, data and control information between a processing nodes and other resources outside a processing node, such as cache, memory, and input/output (I/O) interfaces. System interconnect 108 may be implemented through one or more buses and switches and may represent, for example, a bused interconnect, a switched interconnect, or a hybrid interconnect.

In one example, each processing node may represent a multi-chip module (MCM) including multiple processing unit, such as processing unit 110, processing unit 114, processing unit 118, and processing unit 124. Each of the processing units in a processing node may be coupled for conveying address, data, and control information with each other and system interconnect 108 by a local interconnect 126. Local interconnect 126 may be implemented through one or more buses and switches. In one example, the combination of system interconnect 108 and a local interconnect of each processing node, such as local interconnect 126 of processing node 102, may form a system fabric. The system fabric may also include sets of links and buses, internal and external that support communication between multiple processing nodes based on a particular protocol. In one example, the system fabric may also be referred to as a coherence bus, processor bus, or symmetric multiprocessing (SMP) bus. In additional or alternate embodiments, data processing system 100 may include additional or alternate processing nodes and additional or alternate layers of system interconnects and local interconnects.

In one example, each processing node of data processing system 100, such as processing node 102 and processing node 130, may include one or more memory controllers coupled to a local interconnect, such as a memory controller (MC) 104 coupled to local interconnect 126, to provide an interface for controlling system memory, such as system memory 112, system memory 116, system memory 120, and system memory 122. In one example, data and instructions residing in system memory 112, system memory 116, system memory 120, and system memory 122 may be accessed, cached, and modified by a processor core in any processing unit of any processing node within data processing system 100. In one example, system memory 112, system memory 116, system memory 120, and system memory 122 may represent a lowest level of memory storage in a distributed shared memory system of data processing system 100. In additional or alternate examples, additional or alternate MCs may be coupled to system interconnect 108. In additional or alternate examples, each of processing node 102 and processing node 130 may include additional or alternate memory layers. In additional or alternate examples, data processing system 100 may include additional or alternate memory systems and subsystems connected via system interconnect 108 or may connect to memory systems and subsystems external to data processing system 100.

In one example, each processing unit, such as processing unit 110, processing unit 114, processing unit 118, and processing unit 124, may represent a processor chip that is a physically integrated circuit that include one or more processor cores, one or more caches, or both. In one example, a processor core may represent a single physical processing unit. Each processor core may be capable of having one or more threads dispatched to the processor core with each thread representing an ordered sequence of instructions. In one example, the ordered sequence of instruction of a thread may include, but is not limited to, handling instructions triggered by an interrupt signal. In one example, one or more types of interrupts may be communicated via the system fabric generated by one or more sources. In one example, each thread of a processor core may be referred to as a physical processor (PP) thread or a hardware thread. In one example, each PP thread may also refer to a logical core.

In one example, interrupts triggered within data processing system 100 may have an assigned priority and may be triggered from a hardware interrupt or a software interrupt. In one example, a hardware interrupt may be generated by one or more hardware components within or connected to data processing system 100 including, but not limited to, a core and an input/output device. In one example, a software interrupt may be triggered by one or more software components, such as, but not limited to, an exception condition in a processor or a special instruction in an instruction set architecture (ISA) that, when executed, causes an interrupt to be generated. Depending on the priority of an interrupt, a processing unit may respond to the interrupt by one or more of suspending current activities, saving state, and executing an interrupt handler to service the event. Following the serving of an interrupt, a processing unit may resume suspended activities.

According to one or more embodiments of the present invention, interrupts are managed in the system fabric through a bus protocol that implements a sequence of one or more single bus commands to determine the capability of multiple PP threads across multiple processing nodes, to determine the availability of any PP threads that are capable to handle the interrupt, and if there are multiple PP threads that are capable and available, assigning a single PP thread to handle an interrupt. In one example, the single bus commands supported by the bus protocol may include, but are not limited to, a histogram, poll, assign, and broadcast command. In one example, the particular sequence of the single bus commands issued for a particular interrupt is determined by a master processing unit, but each of the processing units receiving the single bus commands executes each bus command to completion independently of each other processing unit. Managing the determination of the capability and availability of multiple PP threads through a sequence of one or more single bus commands in a bus protocol for a system fabric including multiple PP threads distributed across multiple cores, processing units, and nodes, minimizes the overall time required for interrupt handling. In particular, because interrupt handling may include one or more processors responding to the interrupt by suspending current activities, saving state, and executing a function, as the number of processing cores, processing units, and processing nodes connected on a system fabric increases, there is a need to minimize the time required to determine the capability and availability of PP threads to handle an interrupt, and to select the PP thread to handle the interrupt, to minimize the performance impact to data processing system 100 handling each interrupt.

In one example, the system fabric in which the interrupt bus protocol is implemented may control the scope of the commands within data processing system 100. In one example, each of the interrupt bus protocol commands may be sent to all the processing units interconnected in data processing system 100, or to a subset of the processing units interconnected in data processing system 100, through a scope setting in the interrupt bus protocol. In one example, the interrupt bus protocol may be run a single time on all or a subset of the processing units of data processing system 100. In another example, one or more steps of the interrupt bus protocol may be run multiple times with a separate subset of processing units and a best subset of processing units selected for one or more additional steps of the interrupt bus protocol. For example, the interrupt histogram command may be run multiple times, on different subsets of processing nodes, and based on the combined results of running the interrupt histogram command multiple times, a particular subset that includes capability to handle the interrupt may be selected as the best, or most likely, to yield a PP thread that is also available to handle the interrupt, such that for the next steps of running the interrupt poll command or interrupt broadcast command the scope may be set to the particular subset of processing nodes.

Those of ordinary skill in the art will appreciate that data processing system 100 of FIG. 1 may include additional or alternate components, including, but not limited to, additional processing units, additional system memory, interconnect bridges, non-volatile storage, power controllers, and ports for connection to networks or input/output devices. Those of ordinary skill in the art will appreciate that invention described herein is applicable to data processing systems of diverse architectures and are in no way limited to the generalized data processing system architecture illustrated in FIG. 1.

Figure 2:
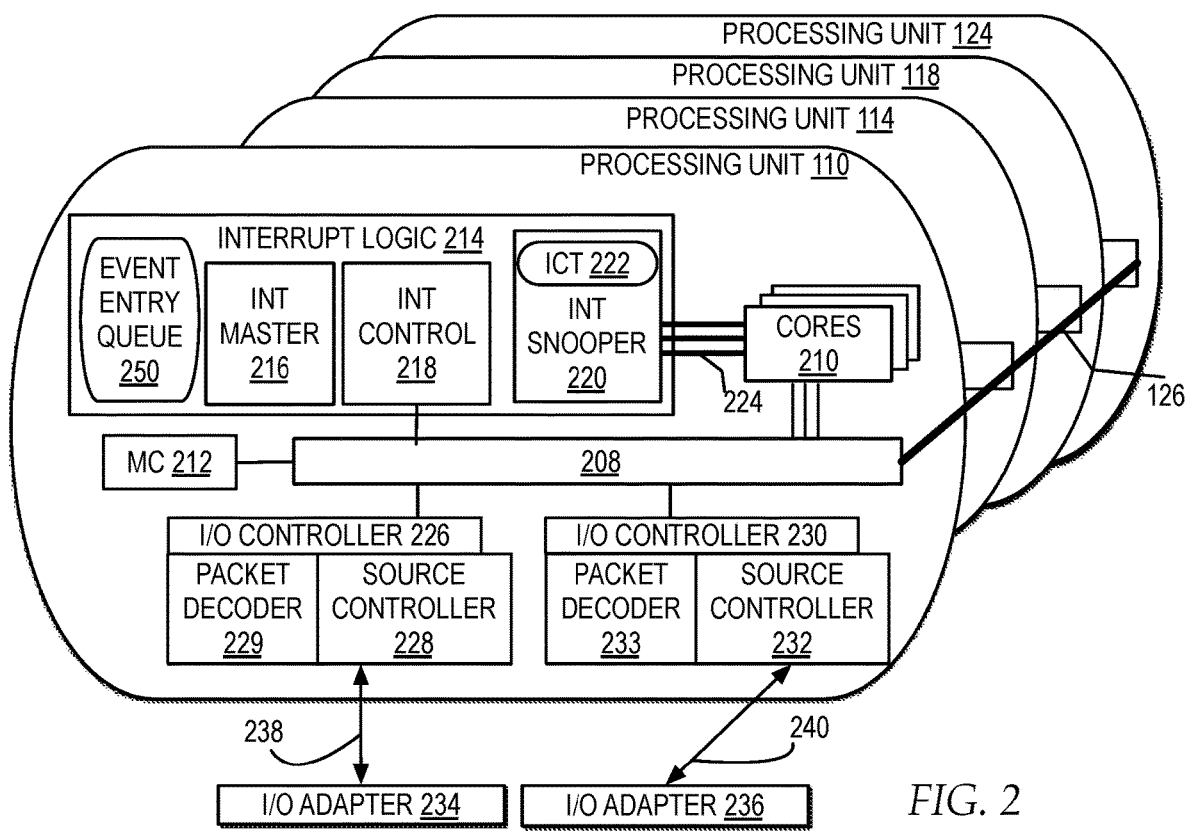
FIG. 2 illustrates a block diagram of one example of one or more cores within a processing unit of multiple processing units of a processing node connected via a system fabric in which interrupts are managed in the system fabric through a bus protocol that determines the capability and availability of multiple physical processor (PP) threads to handle an interrupt by issuing a sequence of one or more single bus commands and assigning a single PP thread to the interrupt.

FIG. 2 illustrates a block diagram of one example of one or more cores within a processing unit of multiple processing units of a processing node connected via a system fabric in which interrupts are managed in the system fabric through a bus protocol that determines the capability and availability of multiple PP threads to handle an interrupt by issuing a sequence of one or more single bus commands and assigning a single PP thread to the interrupt.

In one example, processing unit 110 may include multiple cores, illustrated by cores 210, for processing instructions and data. In one example, each core in cores 210 is connected to a unit interconnect 208. In one example, unit interconnect 208 may represent one or more layers buses and switches, including, but not limited to memory buses, I/O buses, and node buses.

For example, unit interconnect 208 may include one or more buses for connecting to memory and I/O controllers, such as I/O controller 226 and I/O controller 230. In one example, MC 212 may represent a memory controller and a set of links that connect each system memory to a socket of a chip, with MC 212 buses carrying data between a memory controller and each of cores 210.

In one example, unit interconnect 208 may be coupled with other interconnects of other processing units through one or more local interconnects, such as local interconnect 126. In one example, unit interconnect 208 may connect with a separate unit interconnect of each of processing unit 114, processing unit 118, and processing unit 124, via local interconnect 126. In one example, the unit interconnect of each processing unit, such as unit interconnect 208, is connected within the system fabric of local interconnect 126 and system interconnect 108 illustrated in FIG. 1.

In one example, one or more cores of cores 210 may support simultaneous multithreading (SMT). SMT may enable a core to independently execute multiple hardware threads simultaneously. In additional or alternate embodiments, cores 210 may represent multiple cores of a same type of core with a same simultaneous multithreading capacity or cores 210 may represent different types of cores with different features, attributes, and simultaneous multithreading capacity.

In one example, each of cores 210 may be coupled to interrupt logic 214 via unit interconnect 208. In particular, in one example, each of cores 210 may be coupled to interrupt logic 214 via a memory I/O bus of unit interconnect 208. In one example, interrupt logic 214 may include an interrupt (INT) master 216, INT control 218, and INT snooper 220. In one example, interrupt logic 214 may represent the function of an interrupt handler, the execution of which is triggered by an interrupt, to perform interrupt dependent functions.

In one example, INT snooper 220 may include a single interrupt context table (ICT) 222 that maintains one or more types of information for physical processor (PP) threads of cores 210. In one example, the types of information included in ICT 222 may include, but are not limited to, the capability of each PP thread and the availability of each PP thread. In one example, the capability of each PP thread may be indicated by one or more fields that indicate age metrics for a PP thread. The availability of each PP thread may be indicated by one or more fields such as, but not limited to, a valid field asserted to indicate whether a PP thread is populated and operational, an operating priority field, an assigned field indicating whether a pending interrupt is already assigned to the PP thread, an event source number field indicating a source of a pending interrupt, and an event priority field indicating a priority of a current interrupt. In addition, in one example, each PP thread may be identified by a separate logical core value or logical thread number identified in ICT 222. In one example, a valid bit may be asserted to indicate whether the PP thread is populated and operational. In additional or alternate examples, INT snooper 220 may maintain additional ICTs may for each software stack level that is dispatched on a PP thread. For example, a first ICT may be implemented for a hypervisor (Hyp) stack level, a second ICT may be implemented for an operating system (OS) stack level, and a third ICT may be implemented for a user stack level. In additional or alternate embodiments, additional or alternate numbers and types of stack levels may be implemented.

In one example, INT snooper 220 may also be coupled to multiple I/O controllers, such as I/O controller 226 and I/O controller 230, via unit interconnect 208. In one example, INT snooper 220 is configured to receive and send information via unit interconnect 208 from and to I/O controller 226 and I/O controller 230 and cores 210. In additional or alternate embodiments, processing unit 110 may include additional or alternate I/O controllers.

In addition, in one example, INT snooper 220 is also coupled to each core of cores 210 via exception lines 224. In one example, exception lines 224 are used to notify each core within cores 210 of an associated interrupt for an assigned core processor thread. In one example, INT snooper 220 may signal an interrupt to cores 210 via one or more exception lines 224. In one example, exception lines 224 may include different exception lines implemented for each software stack level. In particular, a separate set of lines within exception lines 224 may be connected to each individual PP thread of a core and multiple wires may be implemented for each thread, where each of the multiple wires is implemented for a different software stack level. For example, exception lines 224 may include separate sets of three wires for each PP thread available from cores 210, where a first exception wire generates hypervisor interrupts, a second exception wire generates O/S interrupts, and a third exception wire generates an Event Based Branch. In one example, interrupt logic 214 combines multiple interrupt sources onto multiple exception lines 224 and facilitates the assignment of priority levels to different interrupts. In additional or alternate embodiments, exception lines 224 may include additional or alternate numbers, configurations, and specifications of sets of wires for each PP thread.

In one example, each I/O controller coupled to unit interconnect 208 may include one or more components such as, but not limited to, a packet decoder and an interrupt source controller, such as packet decoder 229 and source controller 228 of I/O controller 226 and such as packet decoder 233 and source controller 232 of I/O controller 230. In one example, each of source controller 228 and source controller 232 may include a separate event assignment table, where the values in each event assignment table may be set via software, such as a hypervisor.

In one example, each I/O controller may be further coupled to additional components illustrated as an I/O adapter via an I/O bus, such as I/O adapter 234 coupled to I/O bus 238 and such as I/O adapter 236 coupled to I/O bus 240. In one example, I/O adapter 234 coupled to I/O bus 238 and I/O adapter 236 coupled to I/O bus 240 may represent one or more types of interfaces and buses such as, but not limited to, a peripheral component interconnect express (PCIe), one or more types of Input/Output (I/O) systems, and a Coherent Attached Processor Proxy (CAPP).

In one example, one or more devices may initiate interrupt generation by I/O controller 226 or I/O controller 230 by signaling an I/O adapter connected to the I/O controller to send a packet to the packet decoder via the I/O bus. In one example, the event assignment table of each source controller may include information that the source controller uses to create event routing messages that are sent to INT master 216 via unit interconnect 208.

In one example, INT master 216 is configured to create event notification messages that a source controller, such as source controller 228 or source controller 232, sends to INT snooper 220 via unit interconnect 208, where the event notification messages may include a trigger for an interrupt. While in the example illustrated processing unit 110 includes only a single INT master 216 and a single INT snooper 220, in additional or alternate embodiments, processing unit 110 may be configured with one or more additional INT masters and one or more additional INT snoopers. In one example, INT master 216 may also refer to an interrupt routing controller and INT snooper 220 may also refer to an interrupt presentation controller.

In particular, in one example, INT master 216 may receive interrupt requests from source controller 228, source controller 232 and cores 210. In one example, the interrupt requests may include coalesced interrupt requests and uncoalesced interrupt requests. For example, source controller 228, coupled to a PCIe, may send coalesced interrupt requests to INT master 216 via unit interconnect 208, while source controller 232 and cores 210 may send uncoalesced interrupt requests to INT master 216 via unit interconnect 208. In additional or alternate embodiments each of source controller 228, source controller 232, and cores 210 may be configured to selectively determine whether to send coalesced or uncoalesced interrupt requests.

In one example, when INT master 216 receives notification triggers from source controller 228 or source controller 232, INT master 216 may process the notification per an Interrupt Vector Entry associated with the specific trigger. INT master 216 processing the notification may include, but is not limited to, updating an event entry queue 250 with the notification and triggering an interrupt bus protocol to determine the capability and availability of PP threads on one or more processing units of data processing system 100 to handle the interrupt and select one of the PP threads to handle the interrupt. In addition, INT master 216 may handle additional functions for managing state changes of assigned processors or handling a notification if there is not a processor thread currently capable of handling the interrupt.

In one example, INT snooper 220 may receive interrupt bus protocol commands from INT master 216 and manage responses to the interrupt bus protocol commands. In one example, INT snooper 220 may perform prioritization and exception based queuing of interrupts to prevent less favored events from preempting more favored events and from loss if an event is dropped. In particular, in one example, a separate logical thread number may be associated with each of exception lines 224. In one example, each of the logical thread numbers may be stored with each exception line in a line similar to a CAM. In one example, in ICT 222, each logical thread number may be stored with information identifying which separate processes are currently dispatched on each separate PP thread. In one example, ICT 222 may track one or more attributes of the PP threads that may be compared against other threads and compared against incoming interrupt requests. For example, ICT 222 may track how much interrupt work has been handled by each PP thread in a separate age bucket in order to manage even distribution of interrupt processing loads among the PP threads. In one example, the age bucket may track the frequency that a PP thread is interrupted, indicate how long since the PP thread was last dispatched to handle an interrupt, and indicate whether a PP thread has been interrupted too often. In one example, an age bucket may be decremented when the associated PP thread is interrupted, and may be periodically incremented while the associated PP thread is dispatched to implement a rate instrument. Alternatively, the age bucket may be set to increment when an associated PP thread is interrupted, and periodically decrement while the associated PP thread is dispatched. In one example, INT snooper 220 may search the logical thread numbers in ICT 222 to determine the capability and availability of a specific PP thread.

In one example, INT control 218 may function as a bus interface controller between interrupt logic 214 and the rest of processing unit 110. In one example, INT control 218 may manage sequencing of interrupt bus protocols when interrupt logic 214 drives or receives commands. In one example, INT control 218 may perform compare functions to determine if interrupt logic 214 is the destination of a command, such as a store operation used as an interrupt trigger.

In addition, in one example, INT control 218 may drive interrupt bus protocol histogram, poll, assign, and broadcast commands on the system fabric to efficiently determine the capability and availability of PP threads for an interrupt trigger and select a particular PP thread for handling an interrupt. In one example, by INT control 218 driving interrupt bus protocols of histogram, poll, assign and broadcast commands on the system fabric, INT control 218 may support interrupt bus protocols that enable INT master 216 to efficiently determine the capabilities and availability of multiple PP threads across processing unit 110, processing unit 114, processing unit 118, processing unit 124, and other processing units on other processing nodes, such as processing node 102, through issuing a sequence of one or more single bus commands.

Figure 3:
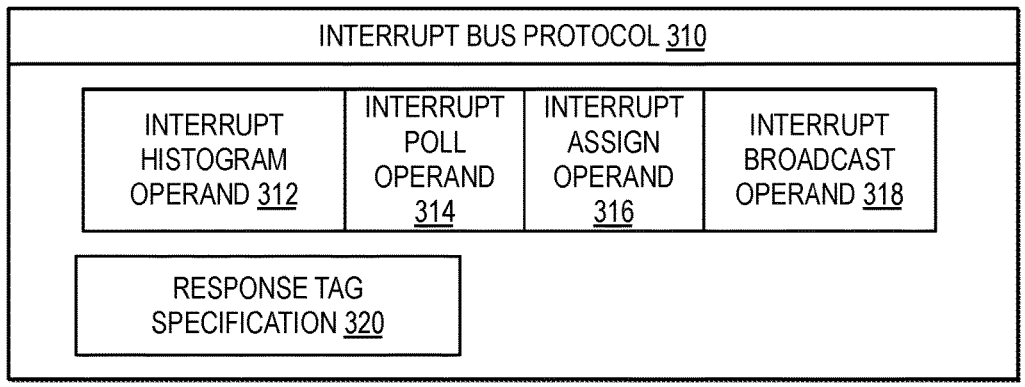
FIG. 3 illustrates a block diagram of interrupt bus protocol commands managed by interrupt logic to allow for efficiently determining the capabilities and availability status of multiple processor threads across multiple processing units, using bus commands, and selecting a particular processor thread to handle an interrupt.

FIG. 3 illustrates a block diagram of one example of interrupt bus protocol commands managed by interrupt logic to allow for efficiently determining the capabilities and availability status of multiple processor threads across multiple processing units, using a sequence of one or more single commands, and selecting a particular process thread to handle an interrupt. In one example, interrupt logic 214 may follow an interrupt bus protocol 310 supported by the system fabric for managing interrupt requests. In one example, INT control 218 may manage an interface between interrupt logic 214 and unit interconnect 208 for implementing interrupt bus protocol 310 on the system fabric of data processing system 100.

In one example, interrupt bus protocol 310 may include one or more types of protocol functions and operands for interrupt management including, but not limited to interrupt histogram operand 312, interrupt poll operand 314, interrupt assign operand 316, and interrupt broadcast operand 318. In one example, interrupt histogram operand 312, interrupt poll operand 314, interrupt assign operand 316, and interrupt broadcast operand 318 may each support specifications for using a single bus command to concurrently communicate with multiple processing units within data processing system 100. In one example, interrupt bus protocol 310 may include a scope element that specifies the scope of each single bus command within data processing system, including whether each single bus command is issued to all or a subset of processing units of data processing system 100.

In addition, interrupt bus protocol 310 may implement one or more types of response specifications, such as a response tag specification 320. In one example, response tag specification 320 may include a specification for each INT snooper within the scope to respond to an interrupt bus protocol command received from INT master 216. In one example, response tag specification 320 may include multiple bits with a first selection of bits selectable as a poll vector with each bit assigned an age bucket or index to an ID, at least one bit for specifying preclusion, at least one bit for specifying collision, and one or more additional bits. Response tag specification 320 may also include a specification for combining the response tags and sending responses.

In one example, INT control 218 may implement a bus interface control for implementing interrupt bus protocol 310 and interfacing with a system fabric that support interrupt bus protocol 310. In one example, in response to interrupt logic 214 receiving an interrupt, which requires a processor thread for handling, INT control 218 may efficiently manage the sequence of one or more single bus commands and responses supported by interrupt bus protocol 310 within interrupt logic 214 to determine one or more processor threads that are capable and available for handling the interrupt and select a particular processor thread if multiple processor threads are capable and available. In addition, in one example, in response to interrupt logic 214 receiving an interrupt bus protocol command from another processing unit, INT control 218 may efficiently manage the sequence of one or more single bus commands and responses supported by interrupt bus protocol 310 within interrupt logic 214 to respond to the requests for capable and available processor threads and to trigger interrupt handling if a PP thread managed by interrupt logic 214 is selected for handling an interrupt.

In particular, INT control 218 may manage interrupt bus protocol 310 for interrupts that allows for the sampling of PP threads in data processing system 100 through histogram, poll, assign, and broadcast commands, to determine the capabilities and availability status of multiple INT snoopers across multiple processing units. INT master 216 may send single histogram, poll, and broadcast commands, managed by INT control 218, to determine the capabilities and availability status of multiple PP threads managed by multiple INT snoopers, across one or more processing units. The responses returned to INT master 216, by INT control 218, from multiple INT snoopers across one or more processing units may include responses of none, one, or many capable or available, combined into a single response. When there are multiple capable and available responders, INT master 216 may select a responder to the interrupt and send an assign command to assign the selected responder.

Figure 4:
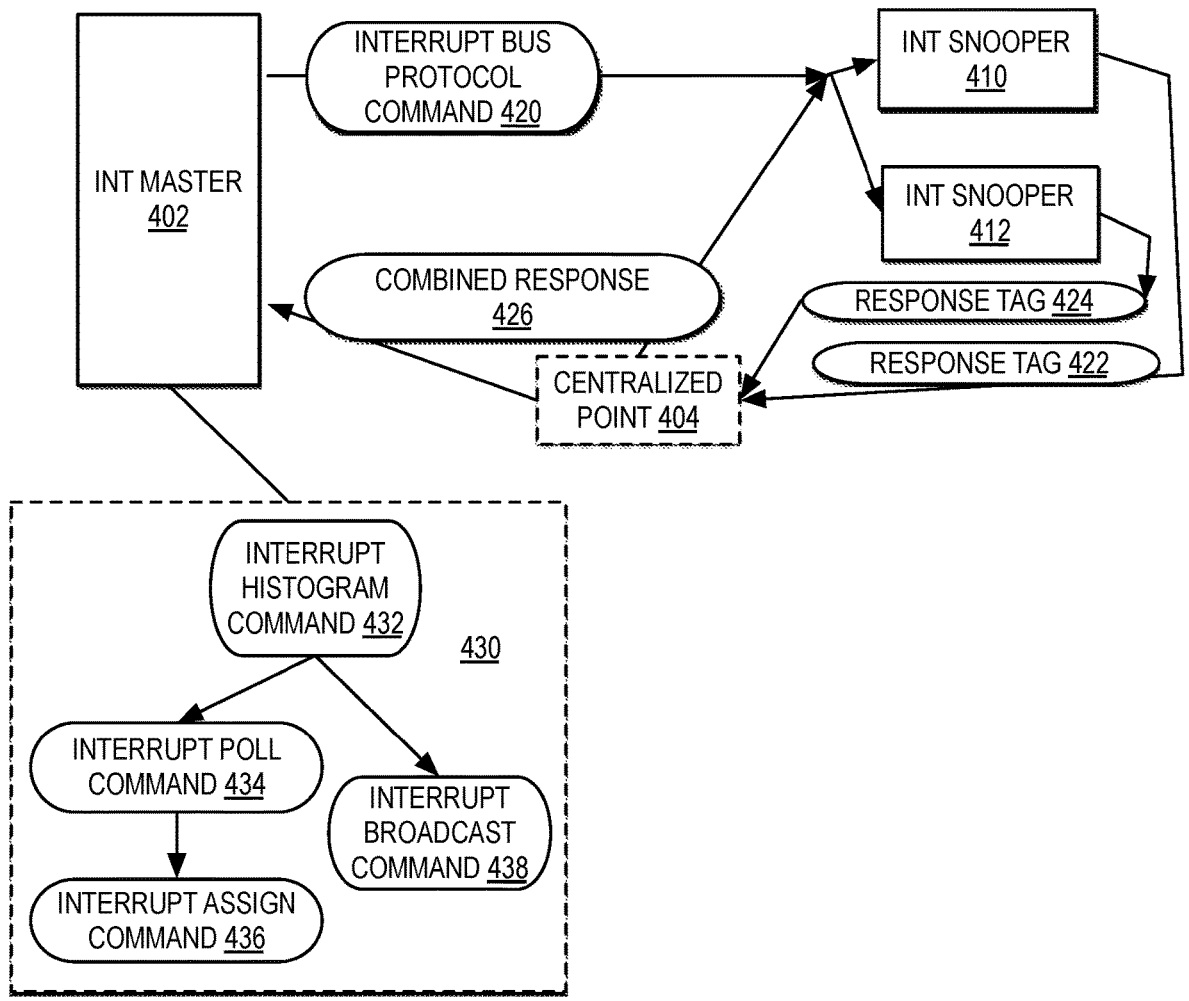
FIG. 4 illustrates a block diagram of one example of a flow of commands and responses to and from interrupt logic distributed across multiple processing units each monitoring capability and availability of multiple separate processor threads on multiple cores.

FIG. 4 illustrates a block diagram of one example of a flow of commands and responses to and from interrupt logic distributed across multiple processing units each monitoring capability and availability of multiple separate processor threads on multiple cores.

In one example, each INT master within interrupt logic of a processing unit within data processing system 100 may issue one or more types of interrupt bus protocol commands supported by specifications in interrupt bus protocol 310, to efficiently identify and select a PP thread to handle an interrupt. In one example, INT master 402 is an example of each INT master that may issue one or more types of interrupt bus protocol commands, specified by interrupt bus protocol 310, to the one or more INT snoopers. For example, INT master 402 may issue a single interrupt bus protocol command 420 that is distributed to each INT snooper specified in a scope, such as an INT snooper 410 and an INT snooper 412. In one example, each of INT snooper 410 and INT snooper 412 may be distributed within a same processing unit as INT master 402 or other processing units from INT master 402, where the other processing units are connected via a system fabric that support interrupt bus protocol 310.

In one example, each INT snooper within interrupt logic of a processing unit within data processing system 100 may respond to a single interrupt bus protocol command 420 by a response tag supported by response tag specification returned to INT master 402. For example, INT snooper 410 may respond with a response tag 422 and INT snooper 412 may respond with a response tag 424.

In one example, interrupt bus protocol 310 may be supported on data processing system 100 by each processing unit responding to interrupt bus protocol commands and sending responses back to a centralized point 404, where at the centralized point a combined response (CRESP) 426 is formed from all the responses received, and sent to the master processing unit and responding units. For example, response tag 422 and response tag 424 are combined at centralized point 404 into combined response 426 which is sent to INT master 402, functioning as the master processing node, and, is output to responders, such as INT snooper 410 and INT snooper 412. In one example, the system fabric, which supports communications between the processing units in interrupt bus protocol 310, may support centralized point 404 to which all responses are sent, where combined response 426 is formed, and then distributed. In another example, interrupt logic 214 of the master processing node sending out an interrupt bus protocol command may also support centralized point 404 to which all responses supported by interrupt bus protocol 310 are sent, such as INT control 218, where INT control 218 then forms combined response 426 that is received by INT master 402 of interrupt logic 214 and sent to other processing units. In additional or alternate embodiments, data processing system 100 may include additional or alternate types of centralized points specified for managing interrupt bus protocol 310 to receive responses from multiple processing units and form a combined response from all the responses received.

In particular, in one example, as illustrated at reference numeral 430, INT master 402 may initially issue interrupt bus protocol command 420 as an interrupt histogram command 432. Depending on combined response 426 from response tag 422 and response tag 424 sent in response to interrupt histogram command 432, INT master 402 may select whether to issue a next interrupt bus protocol command 420 as an interrupt poll command 434 or an interrupt broadcast command 438. If INT master issues interrupt poll command 434, depending on the combined response 426 from response tag 422 and response tag 424 sent in response to interrupt poll command 434, INT master 402 may select whether to issue a next interrupt bus protocol command 420 of interrupt assign command 436.

Figure 5:
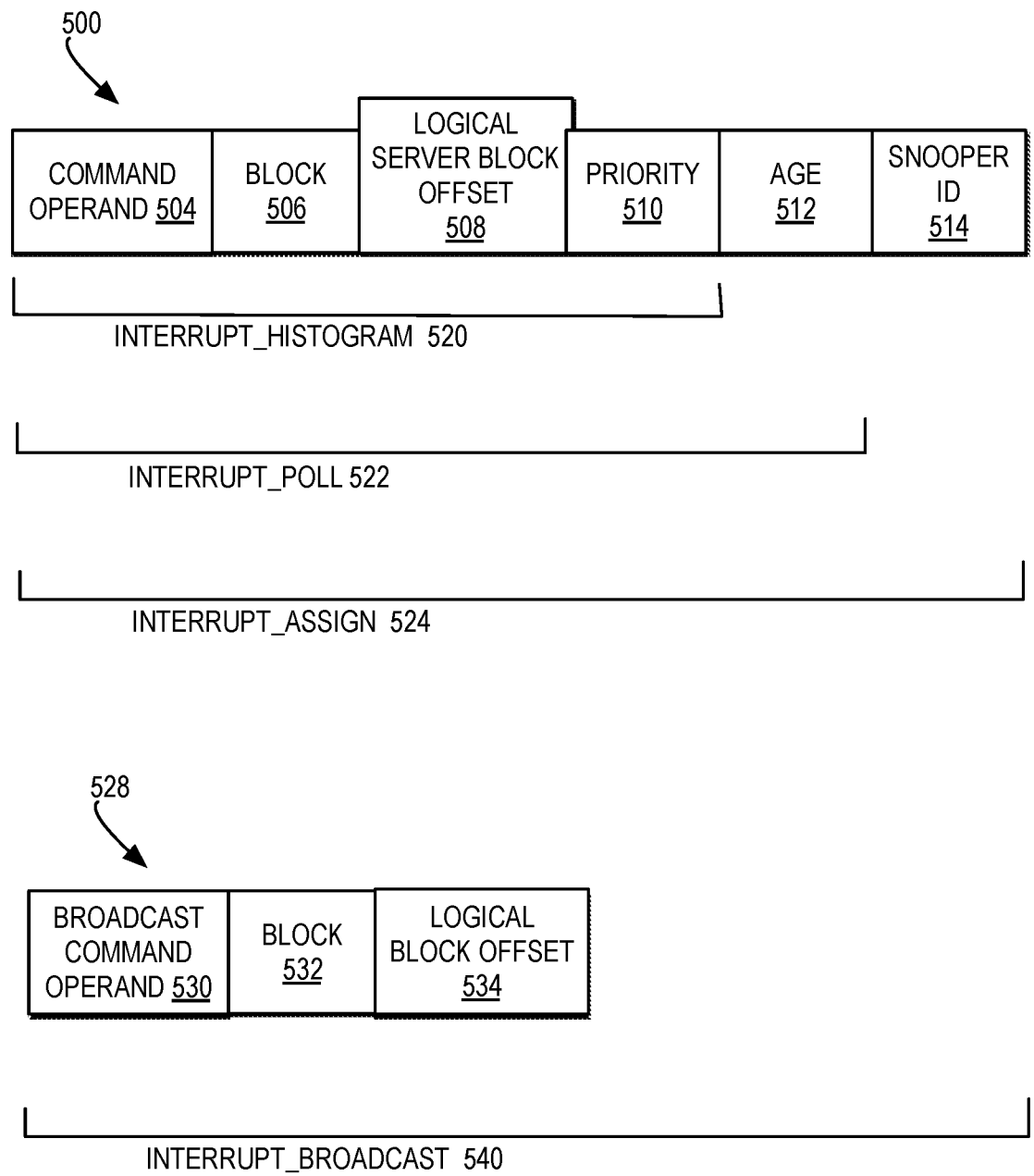
FIG. 5 illustrates a block diagram of one example of operand field specifications for each of the interrupt histogram, interrupt poll, and interrupt assign commands in an interrupt bus protocol.

FIG. 5 illustrates a block diagram of one example of operand field specifications for each of the interrupt histogram, interrupt poll, and interrupt assign commands in an interrupt bus protocol.

As illustrated, bus protocol specification 500 may include a selection of operand command settings and address bits specified. In one example, bus protocol specification 500 may include a selection of bits that are shared among the operand field specifications for the interrupt histogram, interrupt poll, and interrupt assign commands. For example, the selection of bits may include a command operand setting 504, one or more bits specifying a block 506, one or more bits specifying a base logical server block offset 508, one or more bits specifying a priority 510, one or more bits specifying an age 512, and one or more bits specifying a snooper identifier (ID) 514. In one example, bus protocol specification 500 may include additional or alternate bits and additional or alternate specifications.

In one example, as illustrated at reference numeral 520, an interrupt_histogram operand specification, supported by interrupt histogram operand 312, may include bit settings for specifying command operand 504 as a histogram command and may include bits set for block 506, logical server block offset 508, and priority 510. In one example, the interrupt_histogram operand specification illustrated at reference numeral 520 may define a call to INT snoopers on one or more processing units to return a capability to handle a particular type of interrupt operation.

In one example, as illustrated at reference numeral 522, an interrupt_poll operand specification may include bit settings for command operand 504 as a poll command and may include bits set for block 506, logical server block offset 508, priority 510, and age 512. In one example, the interrupt_poll operand specification illustrated at reference numeral 522 may define a call to the INT snoopers on one or more processing units to return an availability to handle the interrupt operation based on a priority setting and age setting.

In one example, as illustrated at reference numeral 524, an interrupt_assign specification may include bit settings for command operation 504 as an assign command, and may include bits set for block 506, logical server block offset 508, priority 510, age 512, and snooper ID 514. In the example, snooper ID 514 may specify a particular processing chip to select the INT snooper assigned to handle an interrupt from among multiple INT snoopers responding.

In one example, a bus protocol specification 528 may include a specification for an interrupt_broadcast command. In one example, as illustrated at reference numeral 540, an interrupt broadcast specification may include a dedicated broadcast command operand 530 and may include broadcast settings of one or more bits specifying a block 532 and one or more bits specifying a base logical server block offset 534. In one example, bus protocol specification 528 may implement a dedicated command type for broadcast command operand 530 to distinguish the command from the command type shared in bus protocol specification 500. In another example, bus protocol specification 528 may be incorporated into bus protocol specification 500 through one or more alternative settings, such as, but not limited to, using command operand 504 specified for interrupt_broadcast, but adding a broadcast bit to bus protocol specification 500 and setting the broadcast bit for the interrupt_broadcast command.

Figure 6:
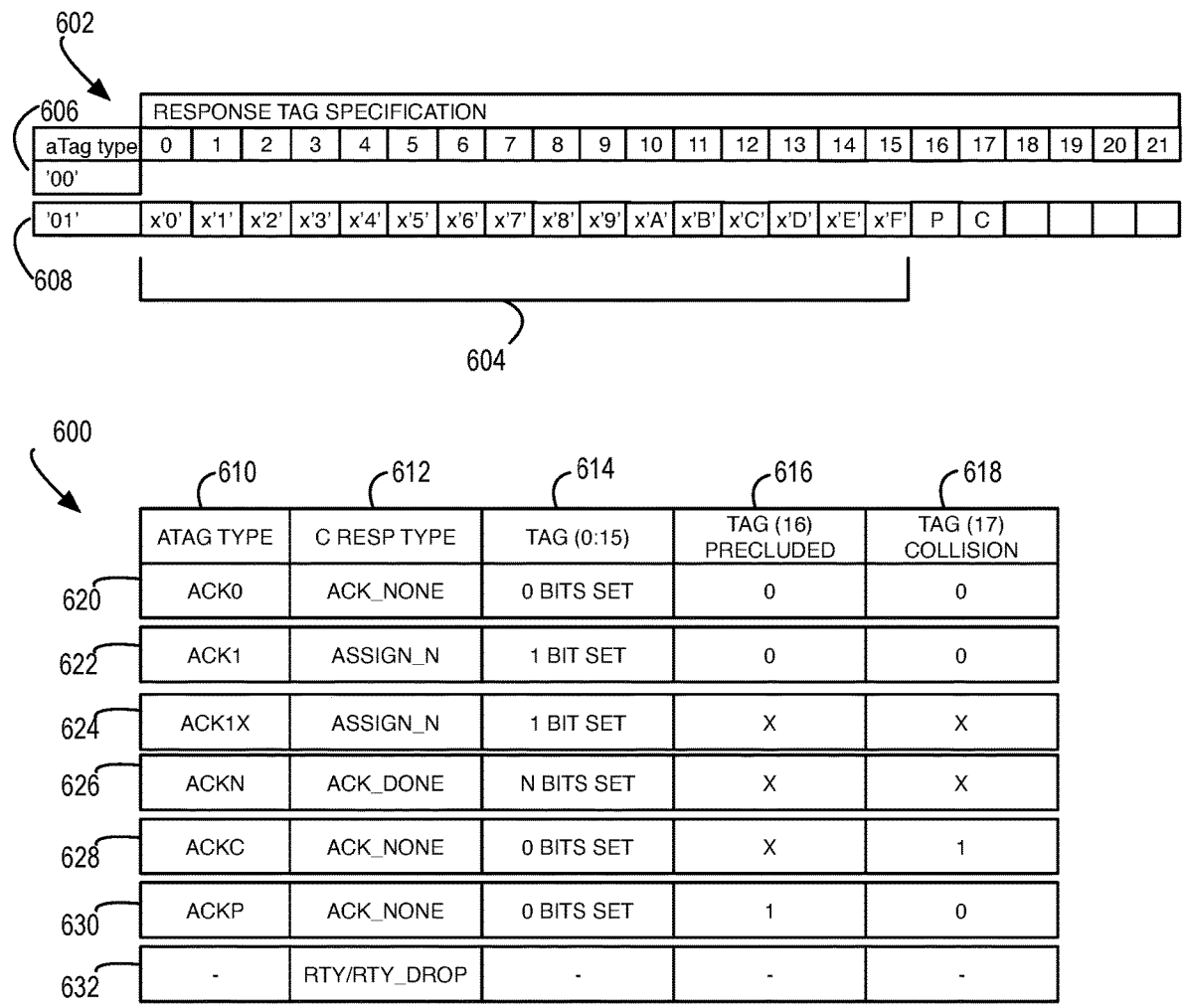
FIG. 6 illustrates a block diagram of one example of a response tag specification for response to each of the interrupt histogram, interrupt poll, interrupt assign, and interrupt broadcast commands and the types of acknowledgements specified by the response tag specification.

FIG. 6 illustrates a block diagram of one example of a response tag specification for response to each of the interrupt histogram, interrupt poll, interrupt assign, and interrupt broadcast commands and the types of acknowledgements specified by the response tag specification.

As illustrated a response tag specification 602 may include an acknowledgement tag (aTAG) type of '00' as illustrated at reference numeral 606 or of '01' as illustrated at reference numeral 608. In one example, when an aTAG type of '00' is asserted, no bits in any of the other fields of the response tag contain information. In one example, when an aTAG type of '01' is asserted, then the other fields of the response tag may contain information. In one example, the other fields of the response tag may include, but are not limited to, a vector with a selection of bits 604 specified for a poll vector with each bit assigned an age bucket or index into an ID, at least one bit setting a preclude setting, at least one bit setting a collision setting, and one or more bits for any additional response information. As illustrated in FIG. 6, bits (0:15) illustrate the selection of bits specifying a poll vector with each bit assigned an age bucket or index into an ID of the INT snooper responding to the interrupt command, bit (16) illustrates a preclude (P) setting, and bit (17) illustrates a collision (C) setting. In one example, a P setting asserted may indicate that higher priority interrupts are already pending on the PP threads capable of handling a particular interrupt. In one example, a C setting asserted may indicate that resources, shared across ICTs of an INT snooper to track commands to completion, have run out and the command needs to be reissued until a shared resource is available again. In another example, a C setting asserted may indicate that an ICT entry resource of an INT snooper is already used to capacity when another command is coming in, where the ICT has limited resources to accept multiple incoming interrupt commands, so a collision is flagged by the C setting to direct the INT master to retry the command again and wait until an ICT entry resource is available again for the INT snooper to accept interrupt commands.

Each INT snooper may independently execute and respond to each interrupt histogram, interrupt poll, interrupt assign, or interrupt broadcast command in a sequence with a response tag based on the response tag specification. In one example, centralized point 404 may receive and combine the response tags received from multiple INT snoopers and determine a type of combined response (C RESP) that is received by the master processing unit.

As illustrated, table 600 illustrates examples of the types of acknowledgement tags and combined response types indicated by specific tag settings in response tag specification 602, when multiple response tags returned in response tag specification 602 are combined at centralized point 404 into combined response 426. As illustrated in table 600, in one example, a first column 610 includes one or more aTAG ID types, a second column 612 includes one or more combined response (C RESP) types, a third column 614 specifies one or more bit settings of the combined poll vector bits as "TAG (0:15)" from selection of bits 604, a fourth column 616 specifies a bit setting of the combined precluded "P" bit "16" in response tag specification 602 as "TAG (16) precluded", and a fifth column 618 specifies a bit setting of the combined collusion "C" bit "17" in response tag specification 602 as "TAG (17) collision".

For example, in table 600, at reference numeral 620, if "TAG (0:15)" include 0 bits set, "TAG (16) precluded" is set to '0', and "TAG (17) collision" is set to '0', then the aTAG type is "ack0" and the C RESP type is "ack_none". At reference numeral 622, if "TAG (0:15)" includes 1 bit set, "TAG (16) precluded" is set to '0', and "TAG (17) collision" is set to '0', then the aTAG type is "ack1" and the C RESP type is "assign_n". At reference numeral 624, if "TAG (0:15)" includes 1 bit set, "TAG (16) precluded" is set to 'X', and "TAG (17) collision" is set to 'X', then the aTAG type is "ack1x" and the C RESP type is "assign_n". At reference numeral 626, if "TAG (0:15)" includes N bits set, "TAG (16) precluded" is set to 'X', and "TAG (17) collision" is set to 'X', then the aTAG type is "ackN" and the C RESP type is "ack_done". At reference numeral 628, if "TAG (0:15)" includes 0 bits set, "TAG (16) precluded" is set to 'X', and "TAG (17) collision" is set to '1', then the aTAG type is "ackC" and the C RESP type is "ack_none". At reference numeral 630, if "TAG (0:15)" includes 0 bits set, "TAG (16) precluded" is set to '1', and "TAG (17) collision" is set to '0', then the aTAG type is "ackP" and the C RESP type is "ack_none". At reference numeral 632, if the combined response tag is set to an aTAG ID of '00', then the C RESP type triggered is "rty/rty_drop". In one example, in the examples at reference numeral 624, reference numeral 626, and reference numeral 628, where table 600 includes an 'X', the bit setting may be a '0' or a '1'.

Figure 7:
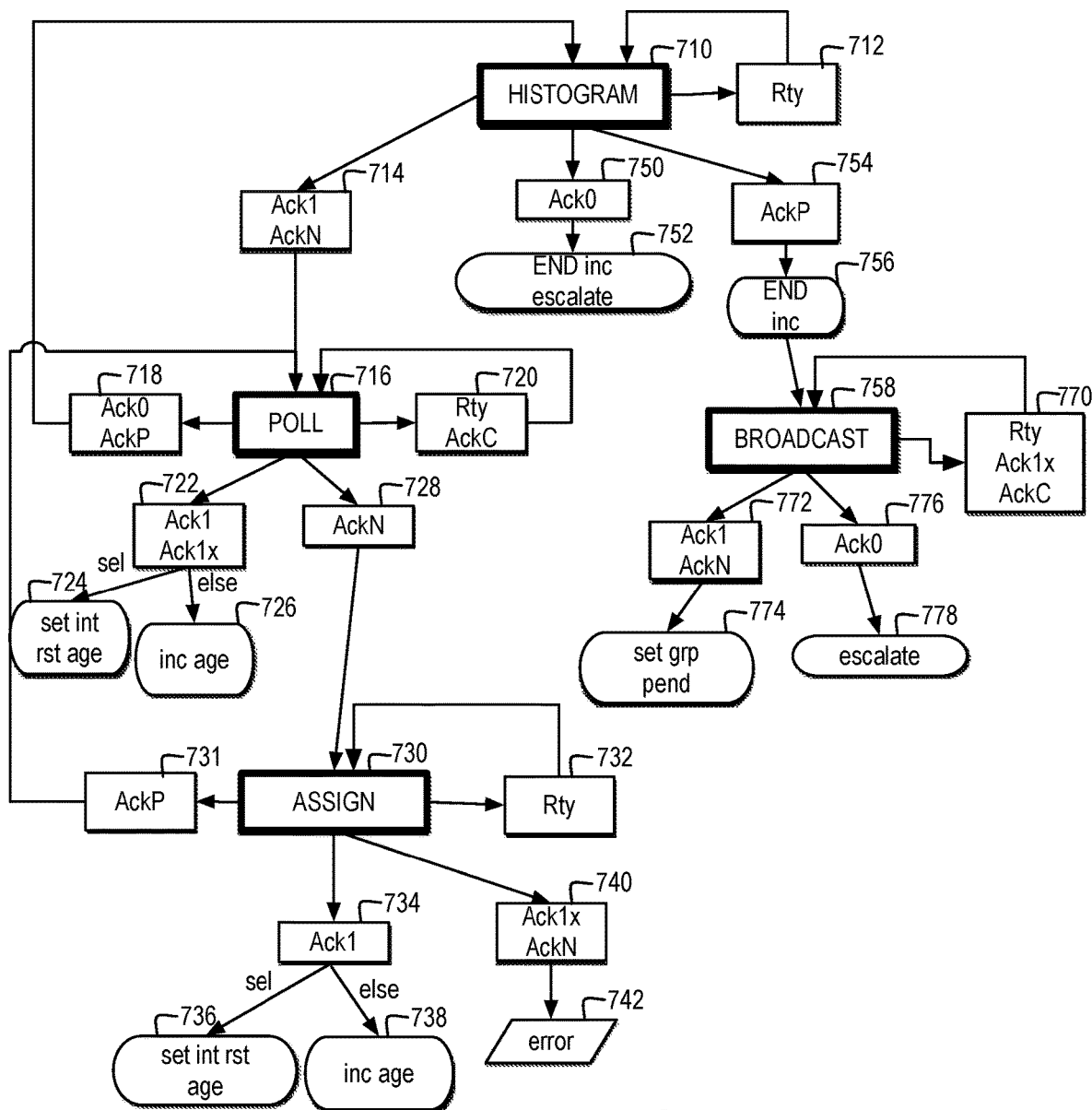
FIG. 7 illustrates a high level logic flowchart of a process and program for managing the interrupt histogram, poll, assign, and broadcast bus protocol commands within interrupt logic of each processing node, for efficiently issuing a sequence of one or more single bus commands to identify one or more processor threads capable and available to handle an interrupt, among multiple processor threads distributed across multiple processing nodes, and select one of the one or more identified processor threads to handle the interrupt.

FIG. 7 illustrates a high level logic flowchart of a process and program for managing the interrupt histogram, poll, assign, and broadcast bus protocol commands within interrupt logic of each processing node, for efficiently issuing a sequence of one or more single bus commands to identify one or more processor threads capable and available to handle an interrupt, among multiple processor threads distributed across multiple processing nodes, and select one of the one or more identified processor threads to handle the interrupt.

In one example, when INT master 216 detects an interrupt signal, INT master 216 may issue an interrupt histogram command, as illustrated at reference numeral 710, to sample the INT snoopers within a particular scope of data processing system 100 and determine which processors threads are capable of handling a particular interrupt. In particular, in one example, INT master 216 may sample the INT snoopers as to which processor threads are capable of handling a particular interrupt by sampling the INT snoopers to determine which age buckets are currently in use for interrupts by the processing unit. In one example, the interrupt histogram command may include a block field and logical server block offset of the processing unit originating the command and a priority setting. In one example, the separate scope setting may specify which INT snoopers to sample using the interrupt histogram command, by specifying all the processing nodes in data processing system 100 or by specifying a subset of processing nodes within data processing system 100.

In one example, in response to the interrupt histogram command, each of the INT snoopers may return a response tag complying with response tag specification 602. In one example, each INT snooper may specify a response tag by searching the INT snooper's thread context entries within ICT 222 for any entries with assigned processes that match the block and logical server block offset specified in the interrupt histogram command and selecting to set response tag according to the results of the search, for example, as illustrated in FIG. 8.

Figure 8:
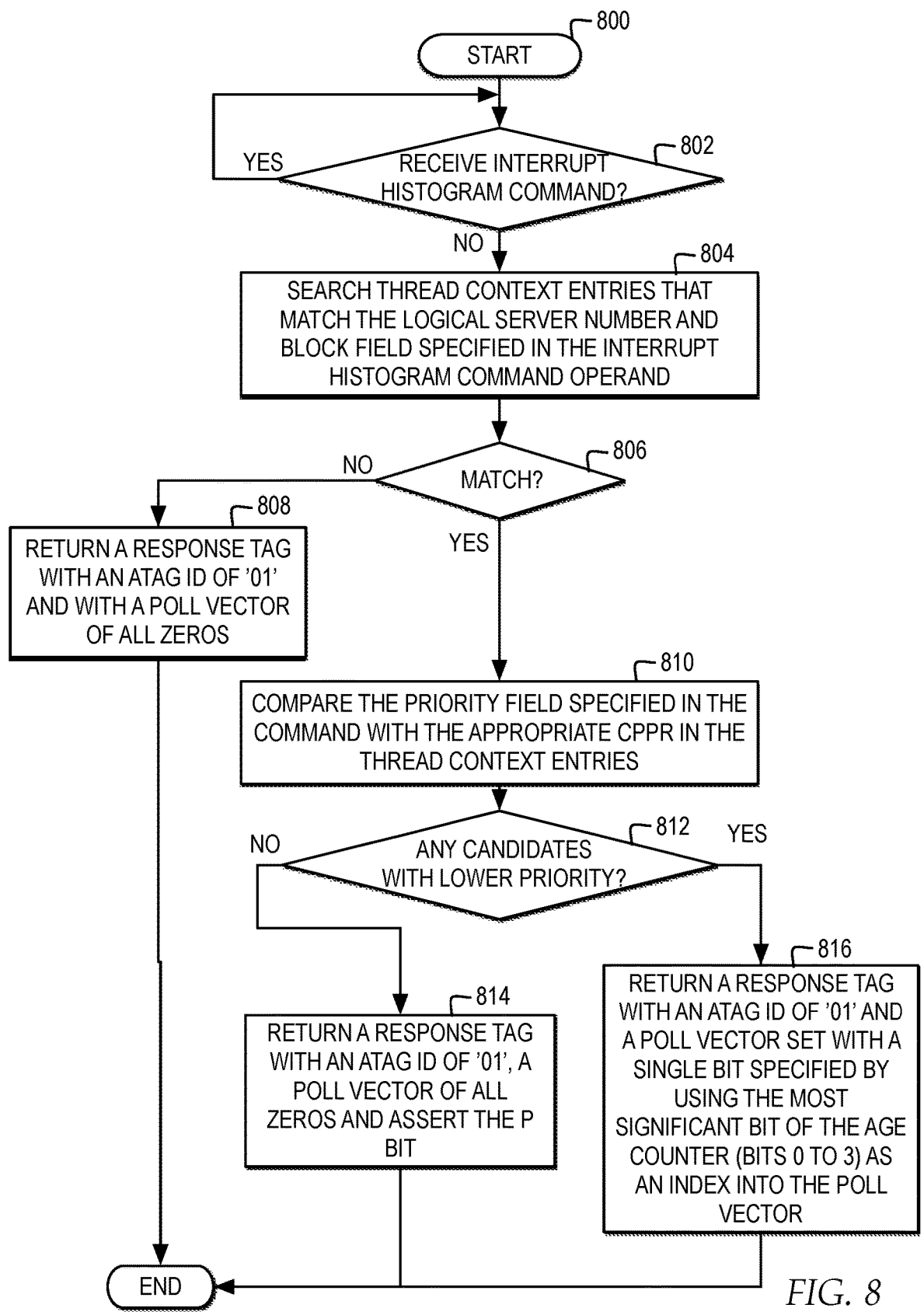
FIG. 8 illustrates a high level logic flowchart of a process and program for each interrupt snooper distributed across multiple processing units determining a response to an interrupt histogram command received from a particular processing unit.

With reference now to FIG. 8, a high level logic flowchart illustrates the process and program for each interrupt snooper distributed across multiple processing units determining a response to an interrupt histogram command received from a particular processing unit. In one example, the process and program starts at block 800 and thereafter proceeds to block 802. Block 802 illustrates a determination whether an interrupt histogram command is received by an INT snooper. At block 802, if an interrupt histogram command is received, then the process passes to block 804. Block 804 illustrates searching for thread context entries in the ICT that match the block and logical server block offset specified in the interrupt histogram command operand. Next, block 806 illustrates a determination whether there is a match between any of the thread context entries and the block and logical server block offset. At block 806, if there are not any matches, then the process passes to block 808. Block 808 illustrates returning a response tag with an aTAG ID set to '01' and the poll vector set to all zeroes, and the process returns.

Returning to block 806, at block 806, if there is a match between any of the thread context entries and the block and logical server block offset, then the process passes to block 810. Block 810 illustrates comparing the priority field specified in the interrupt histogram command with the appropriate current processor priority register (CPPR) in the thread context entries in the ICT. In one example, the CPPR indicates the priority that each PP thread is currently running at. In one example, an interrupt can only be presented if the new interrupt has a higher priority than the CPPR. In one example, priority encoding in the interrupt histogram command may be set to the inverse, such that a priority setting of "0x0" is higher priority than a priority setting of "0x4". Next, block 812 illustrates a determination whether there are any candidate PP threads with a lower priority than the priority set in the interrupt histogram command. At block 812, if there are not any candidate threads with a lower priority, then the process passes to block 814. Block 814 illustrates returning a response tag with an aTAG ID of '01', a poll vector of all zeroes, and the P bit asserted to '1' to indicate that a higher priority interrupt is pending, and the process returns.

Returning to block 812, if there are one or more candidate threads with a lower priority, then the process passes to block 816. Block 816 illustrates returning a response tag with an aTAG ID of '01' and a poll vector setting a single bit specified by using a most significant bit of the age counter, from bits 0 to 3, as an index into the poll vector of the response tag, and the process returns. In one example, the age set in the response tag indicates the oldest or "highest" age from all the PP threads that have lower priority than the priority set in the interrupt histogram command. In one example, the response to the interrupt histogram command will not return a C bit set because the C bit indicates there is no resource reservation needed in the INT snooper for the interrupt histogram command as a query command.

Returning to FIG. 7, centralized point 404 receives all the response tags from the INT snoopers within the scope collected by unit interconnect 208, resulting in multiple bits being set in the partial responses. Centralized point 404 combines the responses and returns the combined response with an aTag type set for the combined response, to INT master 216, along with the age information specified in the combined poll vector. For example, centralized point 404 may determine, from the partial responses of the response tags from multiple INT snoopers, the combined age information reflected in a combined poll vector, in combination with a precluded bit and a collision bit, whether the aTAG type is "ack0", "ack1", "ackN" or "ackP" or the C RESP is "rty" according to the specification illustrated in table 600.

As illustrated in FIG. 7, in one example, if INT master 216 receives an aTAG type of "ack1" or "ackN" from centralized point 404 as illustrated at reference numeral 714, then INT master 216 selects to issue an interrupt poll command as illustrated at reference numeral 716 to assess the availability of processor threads In one example, if INT master 216 receives an aTAG type of "ack0" from centralized point 404 as illustrated at reference numeral 750, indicating that no server is running at the moment, then INT master 216 selects to END INC escalate as illustrated at reference numeral 752. In one example, the END INC escalate command triggers INT master 216 to trigger an increment backlog event to increment a count field in an END structure and subsequently escalate an interrupt to a higher software level, allowing for additional PP threads to be polled, when the responses to the interrupt histogram command indicate that PP threads associated with a current software stack level are interrupted too frequently. In one example, if INT master 216 receives an aTAG type of "ackP" from centralized point 404 as illustrated at reference numeral 754, indicating there is at least one server running but the at least one server is not able to process the escalation at this moment because the at least one server is working on higher priority tasks than the interrupt, then INT master 216 selects to END INC as illustrated at reference numeral 756, and issue an interrupt broadcast command as illustrated at reference numeral 758. In one example, the END INC command trigger INT master 216 to trigger an increment backlog event and subsequently the interrupt broadcast command to notify the affected ICTs that there is an interrupt in the counter backlog which the ICTs should look at once the CPPR is cleared. In one example, if INT master 216 receives a C RESP of "rty" from centralized point 404, then INT master 216 selects to issue another interrupt histogram command, as illustrated at reference numeral 710.

In FIG. 7, in response to INT master 216 determining that the aTAG type for the combined response tag triggers an interrupt poll command, as illustrated reference numeral 716, INT master 216 issues a single interrupt poll command to the scope designated in the scope setting to determine the availability of PP threads by determining which INT snoopers meet the criteria found in the address field bits specified as block, logical server block offset, priority, and age, as illustrated at reference numeral 522, where the contents of the address field are determined by the outcome of the combined age information collected in the combined poll vector by INT master 216 in response to the interrupt histogram command.

In one example, in response to the interrupt poll command, each of the INT snoopers may return a response tag complying with response tag specification 602. In one example, each INT snooper may specify a response tag by searching the INT snooper's thread context entries within ICT 222 and determining whether there are any PP threads available to the INT snooper to service the command and selecting to set response tag according to the results of the determination, for example, as illustrated in FIG. 9.

Figure 9:
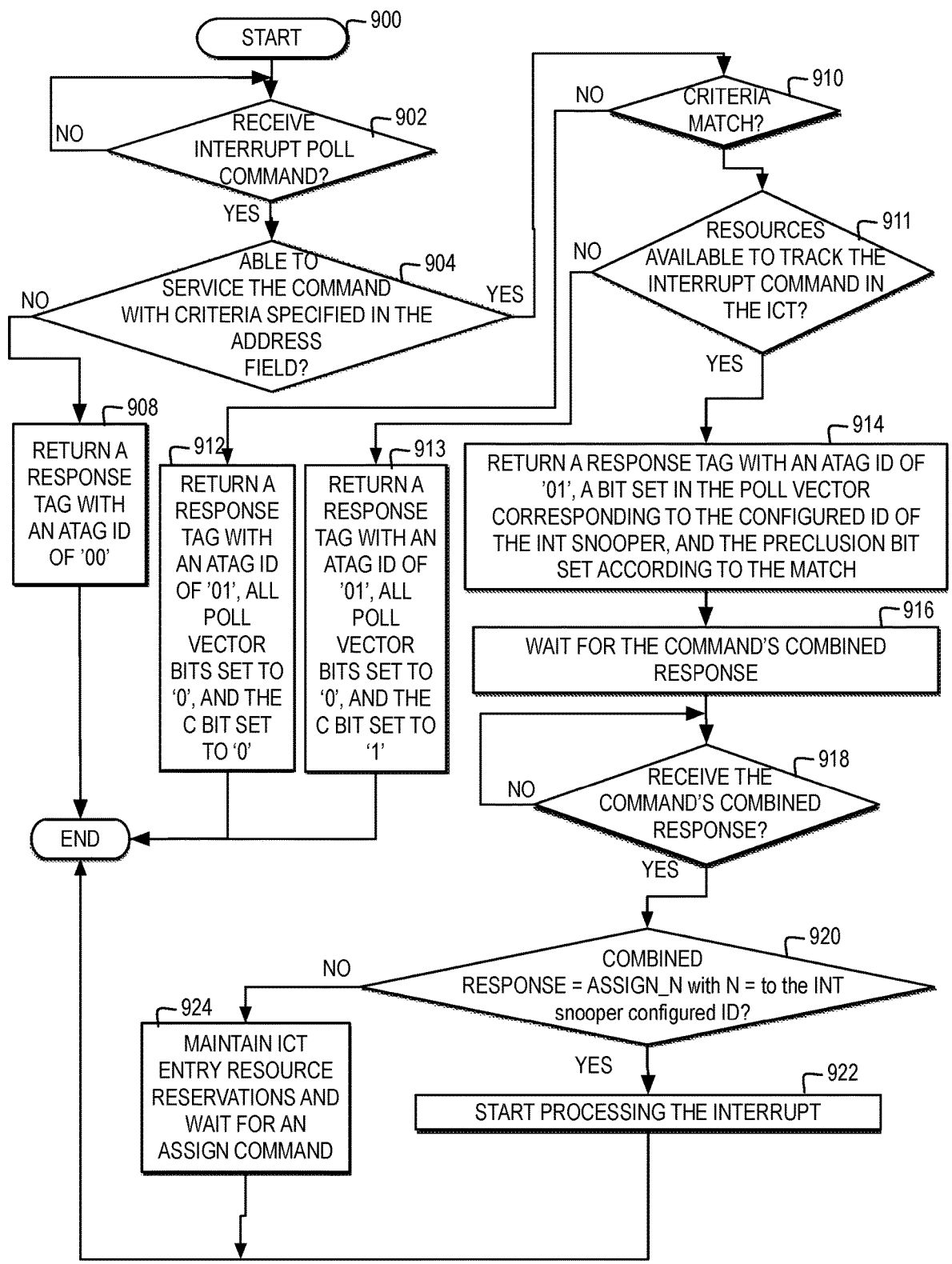
FIG. 9 illustrates a high level logic flowchart of a process and program for each interrupt snooper distributed across multiple processing units determining a response to an interrupt poll command received from a particular processing unit.

With reference now to FIG. 9, a high level logic flowchart illustrates the process and program for each interrupt snooper distributed across multiple processing units determining a response to an interrupt poll command received from a particular processing unit. In one example, the process starts at block 900 and thereafter proceeds to block 902. Block 902 illustrates a determination whether an interrupt poll command is received. At block 902, if an interrupt poll command is received, then the process passes to block 904. Block 904 illustrates a determination whether the INT snooper is able to service the command with the criteria specified in the address field. At block 904, if the INT snooper is not able to service the command with criteria specified in the address field, then the process passes to block 908. Block 908 illustrates returning a response tag with an aTAG ID of '00', and the process ends.

Returning to block 904, if the INT snooper is able to service the command with criteria specified in the address field, such as the block, logical server block offset, and age, then the process passes to block 910. Block 910 illustrates a determination whether the criteria matches. At block 910, if the criteria does not match, then the process passes to block 912. Block 912 illustrates returning a response tag with the aTAG ID of '01', all poll vector bits set to '0' and the C bit set to '0', and the process ends. Returning to block 910, at block 910, if the criteria matches, then the process passes to block 911. Block 911 illustrates a determination whether there are resources available to track the interrupt command by the ICT of the snooper. At block 911, if there are not resources available to track the interrupt command by the ICT of the snooper, then the process passes to block 913. Block 913 illustrates returning a response tag with the aTAG ID of '01', all poll vector bits set to '0' and the C bit set to '1', and the process ends. Returning to block 911, at block 911, if there are resources available to track the interrupt command by the ICT of the snooper, then the process passes to block 914. Block 914 illustrates returning a response tag with the aTAG ID of '01', and either a bit set in the poll vector corresponding to the configured ID of the INT snooper or, if the INT snooper is precluded, and the P bit may be set, and the process passes to block 916.

Block 916 illustrates waiting for the command's combined response from centralized point 404. At block 918, if a combined response is not received, the process continues to wait, however, a timeout period may be set, after which if no combined response is received, an error is detected. At block 918, if a combined response is received, then the process passes to block 920. Block 920 illustrates a determination whether the C RESP is set to an "assign_n" setting with N set to the INT snooper configured ID. In one example, a C RESP of "ack_done" may indicate that multiple INT snoopers with matching criteria responded and INT master 216 is required to select which INT snooper is assigned the interrupt and issue an interrupt assign command to complete the interrupt assignment. In one example, a C RESP of "assign_n" indicates a single INT snooper responded, where N corresponds to the INT snooper configured ID. In one example, a C RESP of "rty" or "rty_drp" indicates that the command is being retried by an INT snooper or the command has been dropped.

At block 920, if the combined response is not set to an "assign_N" setting with N set to the INT snooper configured ID, but is set to "ack_done", then the process passes to block 924. Block 924 illustrates maintaining the ICT entry resource reservations and waiting for an assign command, and the process ends. Returning to block 920, if the combined response is set to "assign_n" setting with the N set to the INT snooper configured ID, then the process passes to block 922. Block 922 illustrates starting to process the interrupt, and the process ends. In one example, starting to process the interrupt may include, but is not limited to, setting an assigned field associated with a selected PP thread in an ICT to indicate the interrupt is assigned to the PP thread.

Returning to FIG. 7, in one example, INT master 216 may receive the aTAG type indicated by the combined response tag from the response tags received in response to the interrupt poll command. In one example, if INT master 216 receives an aTAG type of "ack0" or "ackP" from centralized point 404, as illustrated at reference numeral 718, indicating that no INT snooper responded indicating matching criteria and no collision bit is set, then INT master 216 selects to reissue the interrupt histogram command, as illustrated at reference numeral 710. In one example, if INT master 216 receives an aTAG type of "ack1" or "ack1x" from centralized point 404 as illustrated at reference numeral 722, indicating that a single INT snooper responded indicating matching criteria and is handling the interrupt, then INT master 216 selects to set the interrupt reset age as illustrated at reference numeral 724, to direct the ICT of the INT snooper that is handling the interrupt to reset its age bucket to "0" to indicate it is the youngest thread to have served an interrupt in the group, and INT master 216 selects to increment the age as illustrated at reference numeral 726, to direct all other ICT entries that matched the block and logical server block offset of the interrupt command to increment their age, to increase the likelihood of being selected during a next interrupt command distribution.

In one example, if INT master 216 receives an aTAG type of "ackN" from centralized point 404 as illustrated at reference numeral 728, indicating that multiple INT snoopers responded indicating matching criteria, then INT master 216 selects to issue an interrupt assign command with a particular INT snooper selected, as illustrated at reference numeral 730. In one example, if INT master 216 receives an aTAG type of "ackC" or a C RESP of "rty" from centralized point 404 as illustrated at reference numeral 720, indicating that at least one snooper responded indicating matching criteria, but with a C bit set, or indicating that the command is being retried by an INT snooper or was dropped, then INT master 216 selects to reissue an interrupt poll command, as illustrated at reference numeral 716.

In FIG. 7, in response to INT master 216 selecting to issue an interrupt assign command, as illustrated at reference numeral 730, INT master 216 selects a particular INT snooper from among the responding INT snoopers and issues a single interrupt assign command with the configured snooper ID of the selected INT snooper specified in the operand. In one example, each INT snooper is configured with a separate snooper ID to match a value set in the fields of the operand of the interrupt assign command. In one example, FIG. 10 illustrates the INT control determining whether an interrupt assign command matches a snooper ID for an INT snooper in the interrupt logic and FIG. 11 illustrates an INT snooper specifying a response tag in response to accepting or rejecting an interrupt assignment.

Figures 10, 11:
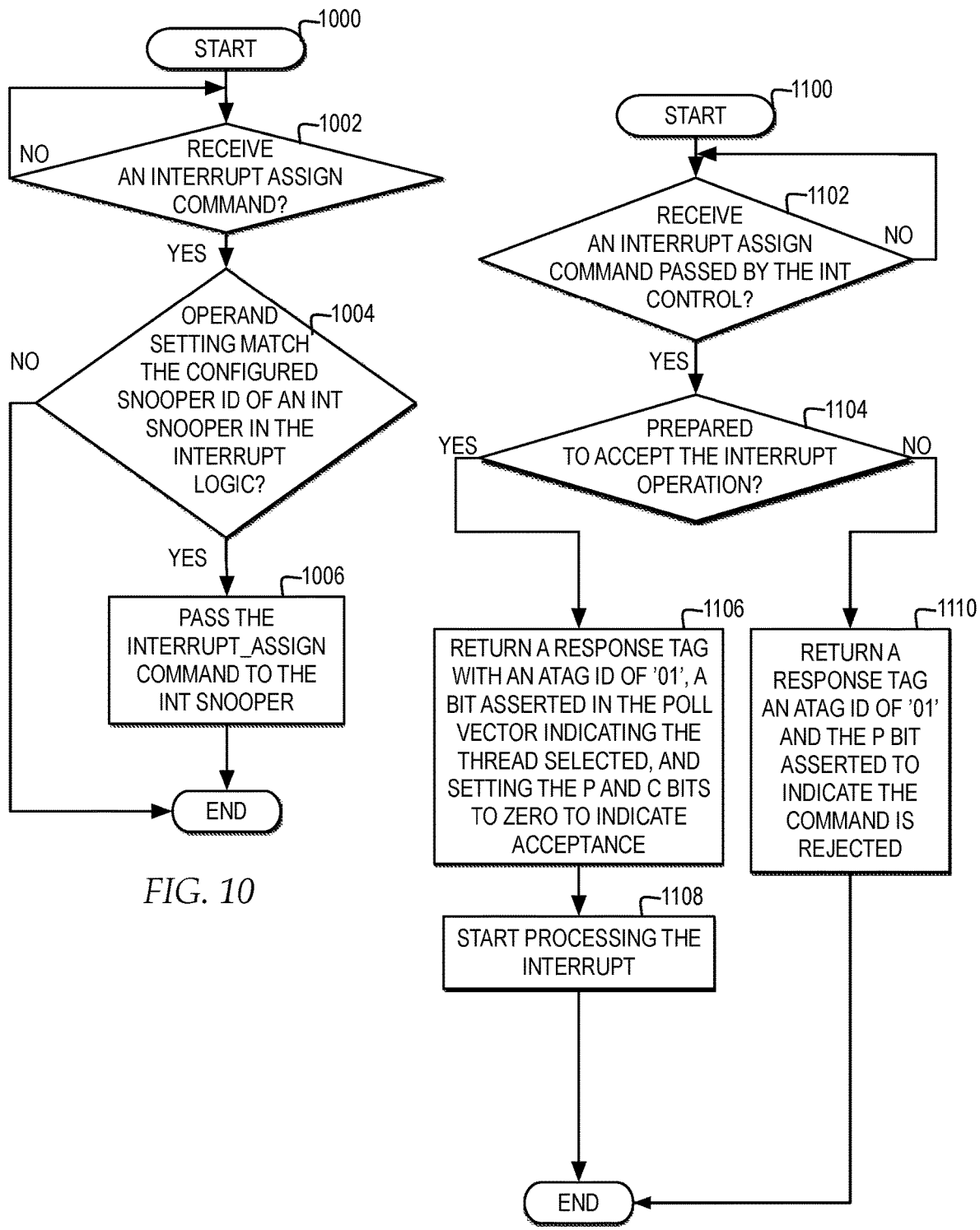
FIG. 10 illustrates a high level logic flowchart of a process and program for each interrupt controller distributed across multiple processing units determining a response to an interrupt assign command.
FIG. 11 illustrates a high level logic flowchart of a process and program for a particular interrupt snooper selected for handling an interrupt assign command specifying a response tag for indicating a response to the interrupt assignment.

Referring now to FIG. 10, a high level logic flowchart illustrates a process and program for each interrupt controller distributed across multiple processing units determining a response to an interrupt assign command. In one example, the process starts at block 1000 and thereafter proceeds to block 1002. Block 1002 illustrates a determination whether an interrupt assign command is received by an interrupt controller. At block 1002, if an interrupt assign command is received, then the process passes to block 1004. Block 1004 illustrates a determination whether the operand setting in the interrupt assign command matches the configured snooper ID of an INT snooper associated with the interrupt controller. At block 1004, if the operand setting in the interrupt assign command does not match the configured snooper ID of an INT snooper associated with the interrupt controller, then the process ends. At block 1004, if the operand setting in the interrupt assign command matches the configured snooper ID of an INT snooper associated with the interrupt controller, then the process passes to block 1006. Block 1006 illustrates passing the interrupt assign command to the INT snooper associated with the interrupt controller, and the process ends.

FIG. 11 illustrates a high level logic flowchart of a process and program for a particular interrupt snooper selected for handling an interrupt assign command specifying a response tag for indicating a response to the interrupt assignment. As illustrated, the process starts at block 1100 and thereafter proceeds to block 1102. Block 1102 illustrates a determination whether an interrupt assign command is received as passed by the interrupt controller. At block 1102, if an interrupt assign command is received as passed by the interrupt controller, then the process passes to block 1104. Block 1104 illustrates a determination whether the INT snooper is prepared to accept the interrupt operation. In one example, an ICT entry that had been reserved in response to the interrupt poll command for an interrupt may have been disabled prior to receiving the interrupt assign command or the CPPR may have changed for the ICT, such that the INT snooper is no longer prepared to accept the interrupt operation.

At block 1104, if the INT snooper is prepared to accept the interrupt operation, then the process passes to block 1106. Block 1106 illustrates returning a response tag with an aTAG ID of '01', a bit asserted in the poll vector indicating the thread selected, and the P and C bits set to zero to indicate acceptance. Next, block 1108 illustrates starting to process the interrupt, and the process ends.

Returning to block 1104 at block 1106, if the INT snooper is not prepared to accept the interrupt operation, then the process passes to block 1110. Block 1110 illustrates returning a response tag with an aTAG ID of '01' and with the P bit set to '1' to indicate the command is rejected, and the process ends.

Returning to FIG. 7, in one example, INT master 216 may receive the aTAG type indicated by a single response from the response tag received in response to the interrupt assign command. In one example, if INT master 216 receives an aTAG type of "ack1" from centralized point 404 as illustrated at reference numeral 734, indicating that the selected INT snooper responded and has accepted handling the interrupt, then INT master 216 selects to set the interrupt reset age as illustrated at reference numeral 736, to direct the ICT of the INT snooper that is handling the interrupt to reset its age bucket to "0" to indicate it is the youngest thread to have served an interrupt in the group, and INT master 216 selects to increment the age as illustrated at reference numeral 738, to direct all other ICT entries that matched the block and logical server block offset of the interrupt command to increment their age, to increase the likelihood of being selected during a next interrupt command distribution. In one example, if INT master 216 receives an aTAG type of "AckP" from centralized point 404 as illustrated at reference numeral 731, this response would indicate that the INT snooper had reserved resources for the interrupt in response to the interrupt poll command, but was not available to handle the interrupt when the interrupt assign command arrived, and therefore would trigger the interrupt poll command to be restarted with the prior age setting. In one example, if INT master 216 receives an aTAG type of "ack1X" or "ackN" from centralized point 404 as illustrated at reference numeral 740, this response would indicate that that multiple INT snoopers responded, which should not occur for an assign command that targets only a single INT snooper, and therefore would trigger an error as illustrated at reference numeral 742. In one example, if INT master 216 receives a C RESP of "rty" from centralized point 404 as illustrated at reference numeral 732, indicating that no snooper responded indicating acceptance but a collision bit is set or indicating that the command is being retried by the INT snooper or was dropped, then INT master 216 selects to reissue an interrupt assign command, as illustrated at reference numeral 730.

Figure 12:
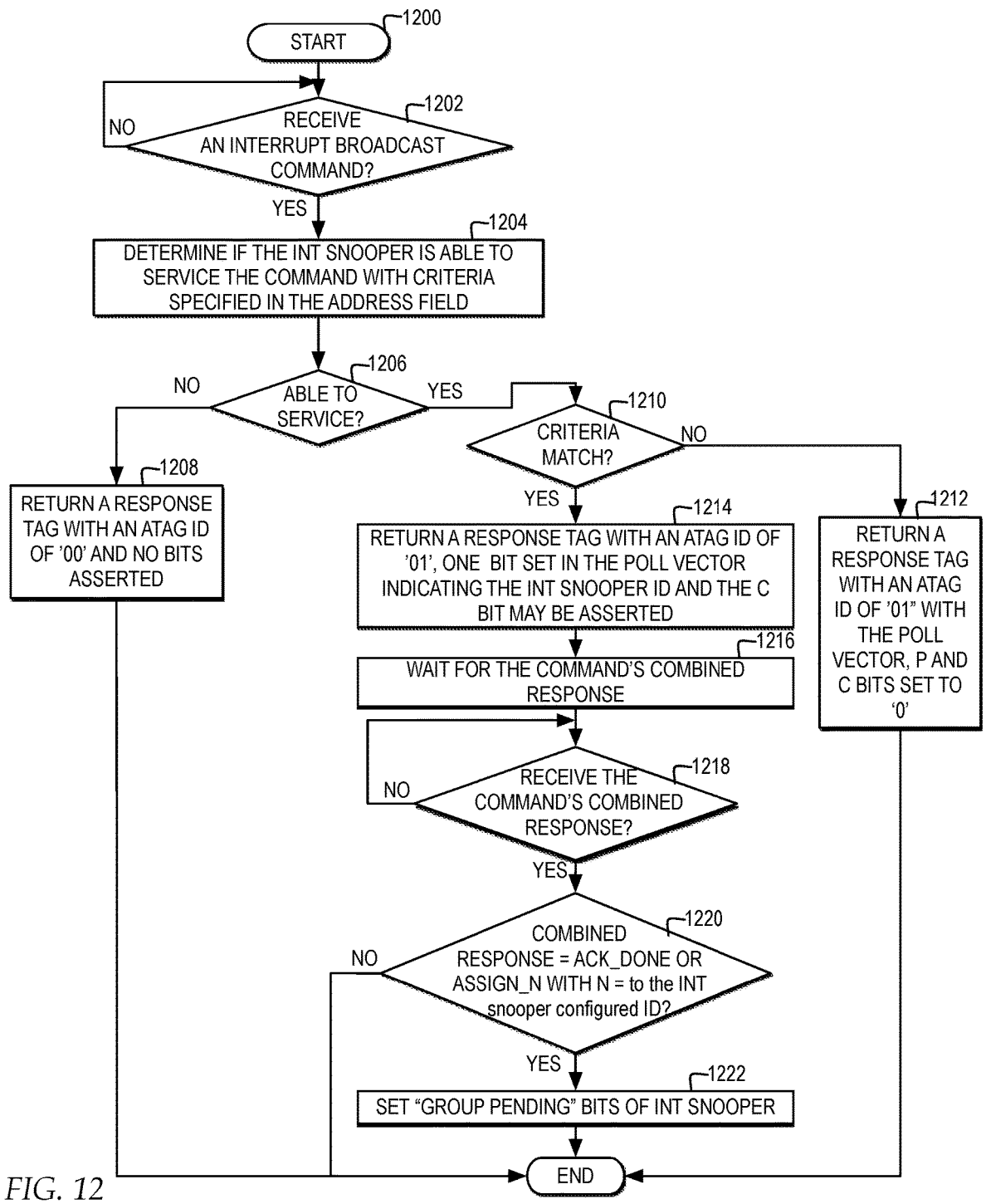
FIG. 12 illustrates a high level logic flowchart of a process and program for each interrupt snooper distributed across multiple processing units determining a response to an interrupt broadcast command received from a particular processing unit.

Returning to INT master 216 determining that the combined response tag triggers an interrupt broadcast command, as illustrated at reference numeral 758, INT master issues a single interrupt broadcast command to determine if the interrupt needs to be escalated or if there is any potential server for the interrupt that is currently running. In one example, the interrupt broadcast command may include an operand specified with a block and a logical server block offset. In one example, each of the INT snoopers may return an acknowledge tag response vector in response to the interrupt broadcast command, such as is illustrated in FIG. 12. In one example, each INT snooper is configured with an ID that is used as an index into the poll vector when the INT snooper responds to the interrupt broadcast command.

With reference now to FIG. 12, a high level logic flowchart illustrates the process and program for each interrupt snooper distributed across multiple processing units determining a response to an interrupt broadcast command received from a particular processing unit. In one example, the process and program begin at block 1200 and thereafter proceed to block 1202. Block 1202 illustrates a determination whether an interrupt broadcast command is received. At block 1202, if an interrupt broadcast command is received, then the process passes to block 1204. Block 1204 illustrates determining if the INT snooper is able to service the command with the criteria specified in the address field. Next, block 1206 illustrates a determination whether the INT snooper is able to service the interrupt command.

At block 1206 if the INT snooper is not able to service the interrupt, then the process passes to block 1208. Block 1208 illustrates returning a response tag with a TAG ID of '00' and no bits asserted, indicating a retry, and the process ends.

Returning to block 1206 at block 1206 if the INT snooper is able to service the interrupt, then the process passes to block 1210. Block 1210 illustrates a determination whether there is a criteria match, where the criteria may include the block and logical server block offset. At block 1210, if there is not a criteria match, then the process passes to block 1212. Block 1212 illustrates returning a response tag with a tag ID of '01' with the poll vector, P bit, and C bit each set to '0', and the process ends.

Returning to block 1210, if there is a criteria match, then the process passes to block 1214. Block 1214 illustrates returning a response tag with an aTAG ID of '01', one bit set in the poll vector indicating the INT snooper ID and the C bit may be asserted. In one example, the C bit may be asserted if there is criteria match but there are not sufficient resources to track the broadcast and no snooper ID bit is set. Next, block 1216 illustrates waiting for the command's combined response, or C RESP, to be returned. In one example, the INT control of the processing node issuing the broadcast command may issue a combined response from the values set in the combined response tag from response tags returned in response to the interrupt broadcast command. Thereafter, block 1218 illustrates a determination whether the command's combined response is received. At block 1218, if the command's combined response is not yet received, then the process continues to wait until a timeout period occurs. At block 1218, if the command's combined response is received, then the process passes to block 1220. Block 1220 illustrates a determination whether the C RESP is set to an "ack_done" setting or an "assign_n" setting with N set to the INT snooper configured ID. At block 1220, if the C RESP is set to an "ack_done" setting or an "assign_n" setting with N set to the INT snooper configured ID, then the process passes to block 1222. Block 1222 illustrates setting the "group pending" bits of the ICT entries that had a criteria match with the interrupt broadcast command to indicate there is are lower priority group interrupts pending, and the process ends.

Returning to block 1210, if there is not a criteria match, then the process passes to block 1212. Block 1212 illustrates returning a response tag with an aTAG ID of '01' and the poll vector, P bit, and C bit all set to zeroes, and the process ends.

Returning to FIG. 7, in one example, INT master 216 may receive the aTAG type indicated by the combined responses from the response tags received in response to the interrupt broadcast command. In one example, if INT master 216 receives an aTAG type of "ack1" or "ackN" from centralized point 404 as illustrated at reference numeral 772, indicating that one or more INT snoopers responded as available to handle the interrupt, then INT master 216 selects to set the group pending (GRP PEND) indicator within each ICT entry that has a criteria match for the interrupt broadcast command as illustrated at reference numeral 774. In one example, if INT master 216 receives an aTAG type of "ack0" from centralized point 404 as illustrated at reference numeral 776, indicating that no INT snoopers are available for processing the interrupt, then INT master 216 selects to escalate the interrupt command as illustrated at reference numeral 778. In one example, if INT master 216 receives an aTAG type of "ackC" or "ack1x" or a C RESP of "rty" from centralized point 404 as illustrated at reference numeral 770, then INT master 216 selects to reissue an interrupt broadcast command, as illustrated at reference numeral 758.

Figure 13:
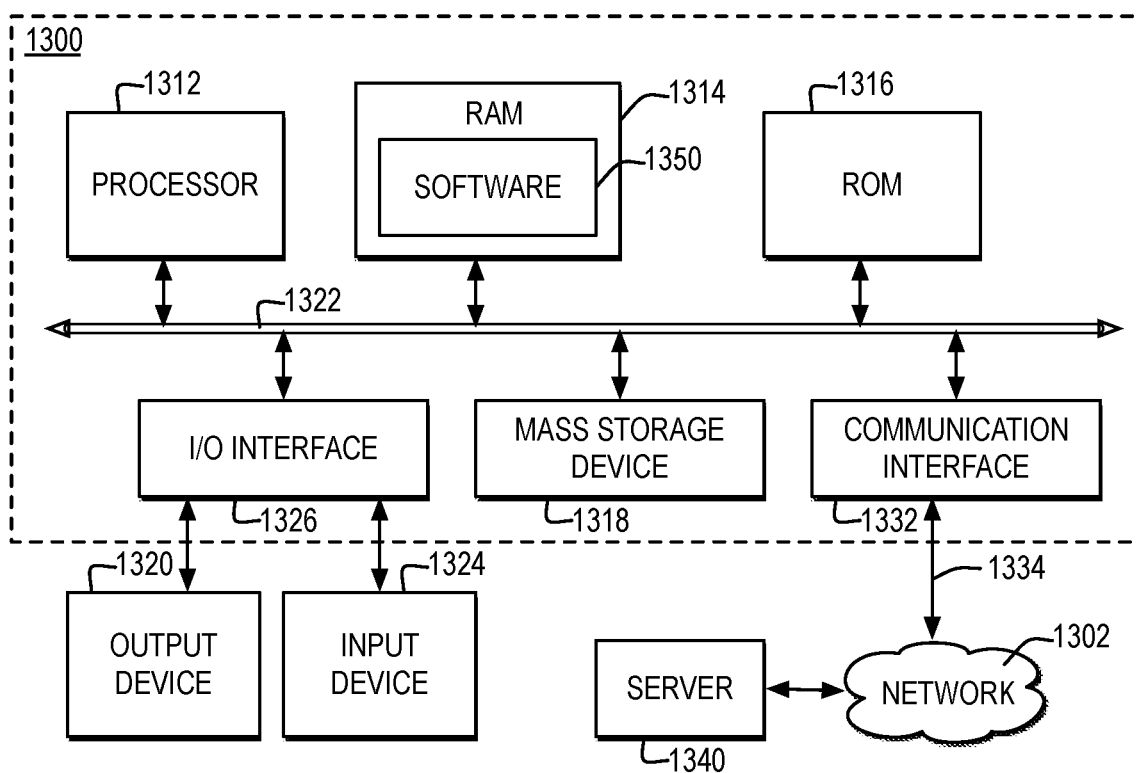
FIG. 13 illustrates one example of a block diagram of a computer system in which one embodiment of the invention may be implemented.

FIG. 13 illustrates a block diagram of one example of a computer system in which one embodiment of the invention may be implemented. The present invention may be performed in a variety of systems and combinations of systems, made up of functional components, such as the functional components described with reference to a computer system 1300 and may be communicatively connected to a network, such as network 1302.

Computer system 1300 includes a bus 1322 or other communication device for communicating information within computer system 1300, and at least one hardware processing device, such as processor 1312, coupled to bus 1322 for processing information. Bus 1322 preferably includes low-latency and higher latency paths that are connected by bridges and adapters and controlled within computer system 1300 by multiple bus controllers. When implemented as a server or node, computer system 1300 may include multiple processors designed to improve network servicing power.

Processor 1312 may be at least one general-purpose processor that, during normal operation, processes data under the control of software 1350, which may include at least one of application software, an operating system, middleware, and other code and computer executable programs accessible from a dynamic storage device such as random access memory (RAM) 1314, a static storage device such as Read Only Memory (ROM) 1316, a data storage device, such as mass storage device 1318, or other data storage medium. Software 1350 may include, but is not limited to, code, applications, protocols, interfaces, and processes for controlling one or more systems within a network including, but not limited to, an adapter, a switch, a server, a cluster system, and a grid environment.

Computer system 1300 may communicate with a remote computer, such as server 1340, or a remote client. In one example, server 1340 may be connected to computer system 1300 through any type of network, such as network 1302, through a communication interface, such as network interface 1332, or over a network link that may be connected, for example, to network 1302.

In the example, multiple systems within a network environment may be communicatively connected via network 1302, which is the medium used to provide communications links between various devices and computer systems communicatively connected. Network 1302 may include permanent connections such as wire or fiber optics cables and temporary connections made through telephone connections and wireless transmission connections, for example, and may include routers, switches, gateways and other hardware to enable a communication channel between the systems connected via network 1302. Network 1302 may represent one or more of packet-switching based networks, telephony based networks, broadcast television networks, local area and wire area networks, public networks, and restricted networks.

Network 1302 and the systems communicatively connected to computer 1300 via network 1302 may implement one or more layers of one or more types of network protocol stacks which may include one or more of a physical layer, a link layer, a network layer, a transport layer, a presentation layer, and an application layer. For example, network 1302 may implement one or more of the Transmission Control Protocol/Internet Protocol (TCP/IP) protocol stack or an Open Systems Interconnection (OSI) protocol stack. In addition, for example, network 1302 may represent the worldwide collection of networks and gateways that use the TCP/IP suite of protocols to communicate with one another. Network 1302 may implement a secure HTTP protocol layer or other security protocol for securing communications between systems.

In the example, network interface 1332 includes an adapter 1334 for connecting computer system 1300 to network 1302 through a link and for communicatively connecting computer system 1300 to server 1340 or other computing systems via network 1302. Although not depicted, network interface 1332 may include additional software, such as device drivers, additional hardware and other controllers that enable communication. When implemented as a server, computer system 1300 may include multiple communication interfaces accessible via multiple peripheral component interconnect (PCI) bus bridges connected to an input/output controller, for example. In this manner, computer system 1300 allows connections to multiple clients via multiple separate ports and each port may also support multiple connections to multiple clients.

In one embodiment, the operations performed by processor 1312 may control the operations of flowchart of FIGS. 7-12 and other operations described herein. Operations performed by processor 1312 may be requested by software 1350 or other code or the steps of one embodiment of the invention might be performed by specific hardware components that contain hardwired logic for performing the steps, or by any combination of programmed computer components and custom hardware components. In one embodiment, one or more components of computer system 1300, or other components, which may be integrated into one or more components of computer system 1300, may contain hardwired logic for performing the operations of flowcharts in FIGS. 7-12.

In addition, computer system 1300 may include multiple peripheral components that facilitate input and output. These peripheral components are connected to multiple controllers, adapters, and expansion slots, such as input/output (I/O) interface 1326, coupled to one of the multiple levels of bus 1322. For example, input device 1324 may include, for example, a microphone, a video capture device, an image scanning system, a keyboard, a mouse, or other input peripheral device, communicatively enabled on bus 1322 via I/O interface 1326 controlling inputs. In addition, for example, output device 1320 communicatively enabled on bus 1322 via I/O interface 1326 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 13, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pukes passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 13 may vary. Furthermore, those of ordinary skill in the art will appreciate that the depicted example is not meant to imply architectural limitations with respect to the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
    receiving, by a particular snooper of a particular processing unit of a plurality of processing units connected via a system fabric, a first single bus command in a bus protocol that allows sampling over the system fabric of the capability of a plurality of snoopers to handle an interrupt, wherein the first single bus command in the bus protocol called through an interrupt histogram command to sample the capability of the plurality of snoopers by requesting an age metric for a particular logical server identifier specified at a particular priority;
    in response to receiving, by the particular snooper, the first single bus command in the bus protocol called through the interrupt histogram, returning, by the particular snooper, a first response indicating the capability of the particular snooper to handle the interrupt, wherein each of the plurality of processing units comprises a respective snooper from among the plurality of snoopers distributed across the plurality of processing units, wherein each respective snooper of the plurality of snoopers controls assignment of interrupts and dispatch of instructions to a separate selection of a plurality of physical processor threads connected to a plurality of cores distributed in each of the plurality of processing units, the first response comprising an acknowledge tag type, a plurality of bits comprising a poll vector, at least one bit identifying a preclusion status relative to the particular priority and at least one bit identifying a collision status, wherein the first response reflects an acknowledgement type from among a plurality of acknowledgement types indicating whether the particular snooper has the capability to handle the interrupt;
    in response to receiving, by the particular snooper, a second single bus command in the bus protocol to poll a first selection of snoopers indicating capability of the plurality of snoopers for an availability status to service a criteria specified in the second single bus command, returning, by the particular snooper, a second response indicating the availability of the particular snooper to service the criteria; and
    in response to receiving, by the particular snooper, a third single bus command in the bus protocol to direct the particular snooper to handle the interrupt, assigning, by the particular snooper, the interrupt to a particular processor thread of a respective selection of the separate selection of the plurality of physical processor threads distributed in the particular processing unit.

2. The method according to claim 1, wherein in response to receiving, by the particular snooper, the first single bus command in the bus protocol called through the interrupt histogram, returning, by the particular snooper, the first response indicating the capability of the particular snooper to handle the interrupt, wherein each of the plurality of processing units comprises a respective snooper from among the plurality of snoopers distributed across the plurality of processing units, wherein each respective snooper of the plurality of snoopers controls assignment of interrupts and dispatch of instructions to a separate selection of a plurality of physical processor threads connected to a plurality of cores distributed in each of the plurality of processing units, the first response comprising the acknowledge tag type, the plurality of bits comprising the poll vector, the at least one bit identifying the preclusion status relative to the particular priority and the at least one bit identifying the collision status, wherein the combined results reflect the acknowledgement type from among the plurality of acknowledgement types indicating whether the particular snooper has the capability to handle the interrupt further comprises:
    returning, by the particular snooper, the response to the interrupt histogram command, wherein the plurality of bits comprising the poll vector indicates an age counter value indicating a frequency of interruptions for handling interrupt commands.

3. The method according to claim 1, wherein in response to receiving, by the particular snooper, the second single bus command in the bus protocol to poll the first selection of snoopers indicating capability of the plurality of snoopers for the availability status to service the criteria specified in the second single bus command, returning, by the particular snooper, the second response indicating the availability of the particular snooper to service the criteria further comprises:
    receiving, by the particular snooper, the second single bus command in the bus protocol called through an interrupt poll command to poll the first selection of snoopers by requesting an availability to service a criteria specified in the second single bus command, the criteria specifying at least one software level, each at least one software level specifying a first selection of the plurality of physical processor threads associated with the at least one software level at each snooper of the plurality of snoopers; and
    returning, by the particular snooper, the second response indicating the availability of the particular snooper to service the criteria, wherein the second response reflects an acknowledgement type from among a plurality of acknowledgement types indicating whether the particular snooper has the availability to handle the interrupt.

4. The method according to claim 1, wherein in response to receiving, by the particular snooper, the third single bus command in the bus protocol to direct the particular snooper to handle the interrupt, assigning, by the particular snooper, the interrupt to the particular processor thread of the respective selection of the separate selection of the plurality of physical processor threads distributed in the particular processing unit further comprises:
    receiving, by the particular snooper, the third single bus command, in response to an interrupt master of interrupt logic connected to the system fabric receiving a respective second response from each of the first selection of snoopers, determining a second selection of snoopers returning the respective response with availability to handle the interrupt, and selecting the particular snooper from among the second selection of snoopers.

5. The method according to claim 1, further comprising:
    in response to receiving, by the particular snooper, a fourth single bus command in the bus protocol broadcasting a request to the plurality of snoopers to check availability to service a criteria specified in the fourth single bus command, the criteria specifying at least one software level, each at least one software level specifying a first selection of the plurality of physical processor threads associated with the at least one software level at each separate snooper from among the plurality of snoopers, returning, by the particular snooper, a fourth response indicating the availability of the particular snooper to service the criteria.

6. A system comprising:
a particular processing unit, of a plurality of processing units connected via a system fabric;
the processing unit, for receiving, by a particular snooper of the particular processing unit, a first single bus command in a bus protocol that allows sampling over the system fabric of the capability of a plurality of snoopers to handle an interrupt, wherein the first single bus command in the bus protocol called through an interrupt histogram command to sample the capability of the plurality of snoopers by requesting an age metric for a particular logical server identifier specified at a particular priority;
the processing unit, in response to receiving, by the particular snooper, the first single bus command in the bus protocol called through the interrupt histogram, for returning, by the particular snooper, a first response indicating the capability of the particular snooper to handle the interrupt, wherein each of the plurality of processing units comprises a respective snooper from among the plurality of snoopers distributed across the plurality of processing units, wherein each respective snooper of the plurality of snoopers controls assignment of interrupts and dispatch of instructions to a separate selection of a plurality of physical processor threads connected to a plurality of cores distributed in each of the plurality of processing units, the first response comprising an acknowledge tag type, a plurality of bits comprising a poll vector, at least one bit identifying a preclusion status relative to the particular priority and at least one bit identifying a collision status, wherein the first response reflects an acknowledgement type from among a plurality of acknowledgement types indicating whether the particular snooper has the capability to handle the interrupt;
the processing unit, in response to receiving, by the particular snooper, a second single bus command in the bus protocol to poll a first selection of snoopers indicating capability of the plurality of snoopers for an availability status to service a criteria specified in the second single bus command, for returning, by the particular snooper, a second response indicating the availability of the particular snooper to service the criteria; and
the processing unit, in response to receiving, by the particular snooper, a third single bus command in the bus protocol to direct the particular snooper to handle the interrupt, for assigning, by the particular snooper, the interrupt to a particular processor thread of a respective selection of the separate selection of the plurality of physical processor threads distributed in the particular processing unit.

7. The system according to claim 6, wherein the processing unit, in response to receiving, by the particular snooper, the first single bus command in the bus protocol called through the interrupt histogram, for returning, by the particular snooper, a first response indicating the capability of the particular snooper to handle the interrupt, wherein each of the plurality of processing units comprises a respective snooper from among the plurality of snoopers distributed across the plurality of processing units, wherein each respective snooper of the plurality of snoopers controls assignment of interrupts and dispatch of instructions to a separate selection of a plurality of physical processor threads connected to a plurality of cores distributed in each of the plurality of processing units, the first response comprising an acknowledge tag type, a plurality of bits comprising a poll vector, at least one bit identifying a preclusion status relative to the particular priority and at least one bit identifying a collision status, wherein the first response reflects an acknowledgement type from among a plurality of acknowledgement types indicating whether the particular snooper has the capability to handle the interrupt further comprises:
the processing unit for returning, by the particular snooper, the response to the interrupt histogram command, wherein the plurality of bits comprising the poll vector indicates an age counter value indicating a frequency of interruptions for handling interrupt commands.

8. The system according to claim 6, wherein the processing unit, in response to receiving, by the particular snooper, the second single bus command in the bus protocol to poll the first selection of snoopers indicating capability of the plurality of snoopers for the availability status to service the criteria specified in the second single bus command, for returning, by the particular snooper, the second response indicating the availability of the particular snooper to service the criteria further comprises:
the processing unit for receiving, by the particular snooper, the second single bus command in the bus protocol called through an interrupt poll command to poll the first selection of snoopers by requesting an availability to service a criteria specified in the second single bus command, the criteria specifying at least one software level, each at least one software level specifying a first selection of the plurality of physical processor threads associated with the at least one software level at each snooper of the plurality of snoopers; and
the processing unit for returning, by the particular snooper, the second response indicating the availability of the particular snooper to service the criteria, wherein the second response reflects an acknowledgement type from among a plurality of acknowledgement types indicating whether the particular snooper has the availability to handle the interrupt.

9. The system according to claim 6, wherein the processing unit, in response to receiving, by the particular snooper, the third single bus command in the bus protocol to direct the particular snooper to handle the interrupt, for assigning, by the particular snooper, the interrupt to the particular processor thread of the respective selection of the separate selection of the plurality of physical processor threads distributed in the particular processing unit further comprises:
the processing unit for receiving, by the particular snooper, the third single bus command, in response to an interrupt master of interrupt logic connected to the system fabric receiving a respective second response from each of the first selection of snoopers, determining a second selection of snoopers returning the respective response with availability to handle the interrupt, and selecting the particular snooper from among the second selection of snoopers.

10. The system according to claim 6, further comprising:
the processing unit, in response to receiving, by the particular snooper, a fourth single bus command in the bus protocol broadcasting a request to the plurality of snoopers to check availability to service a criteria specified in the fourth single bus command, the criteria specifying at least one software level, each at least one software level specifying a first selection of the plurality of physical processor threads associated with the at least one software level at each separate snooper from among the plurality of snoopers, for returning, by the particular snooper, a fourth response indicating the availability of the particular snooper to service the criteria.

11. A computer program product comprising one or more computer-readable storage devices and program instructions, stored on at least one of the one or more storage devices, the stored program instructions comprising:

program instructions to receive, by a particular snooper of a particular processing unit of a plurality of processing units connected via a system fabric, a first single bus command in a bus protocol that allows sampling over the system fabric of the capability of a plurality of snoopers to handle an interrupt, wherein the first single bus command in the bus protocol called through an interrupt histogram command to sample the capability of the plurality of snoopers by requesting an age metric for a particular logical server identifier specified at a particular priority;

program instructions, in response to receiving, by the particular snooper, the first single bus command in the bus protocol called through the interrupt histogram, to return, by the particular snooper, a first response indicating the capability of the particular snooper to handle the interrupt, wherein each of the plurality of processing units comprises a respective snooper from among the plurality of snoopers distributed across the plurality of processing units, wherein each respective snooper of the plurality of snoopers controls assignment of interrupts and dispatch of instructions to a separate selection of a plurality of physical processor threads connected to a plurality of cores distributed in each of the plurality of processing units, the first response comprising an acknowledge tag type, a plurality of bits comprising a poll vector, at least one bit identifying a preclusion status relative to the particular priority and at least one bit identifying a collision status, wherein the first response reflects an acknowledgement type from among a plurality of acknowledgement types indicating whether the particular snooper has the capability to handle the interrupt;

program instructions, in response to receiving, by the particular snooper, a second single bus command in the bus protocol to poll a first selection of snoopers indicating capability of the plurality of snoopers for an availability status to service a criteria specified in the second single bus command, to return, by the particular snooper, a second response indicating the availability of the particular snooper to service the criteria; and program instructions, in response to receiving, by the particular snooper, a third single bus command in the bus protocol to direct the particular snooper to handle the interrupt, to assign, by the particular snooper, the interrupt to a particular processor thread of a respective selection of the separate selection of the plurality of physical processor threads distributed in the particular processing unit.

12. The computer program product according to claim 11, the stored program instructions further comprising:

program instructions to return, by the particular snooper, the response to the interrupt histogram command, wherein the plurality of bits comprising the poll vector indicates an age counter value indicating a frequency of interruptions for handling interrupt commands.

13. The computer program product according to claim 11, the stored program instructions further comprising:

program instructions to receive, by the particular snooper, the second single bus command in the bus protocol called through an interrupt poll command to poll the first selection of snoopers by requesting an availability to service a criteria specified in the second single bus command, the criteria specifying at least one software level, each at least one software level specifying a first selection of the plurality of physical processor threads associated with the at least one software level at each snooper of the plurality of snoopers; and program instructions to return, by the particular snooper, the second response indicating the availability of the particular snooper to service the criteria, wherein the second response reflects an acknowledgement type from among a plurality of acknowledgement types indicating whether the particular snooper has the availability to handle the interrupt.

14. The computer program product according to claim 11, the stored program instructions further comprising:

program instructions to receive, by the particular snooper, the third single bus command, in response to an interrupt master of interrupt logic connected to the system fabric receiving a respective second response from each of the first selection of snoopers, determining a second selection of snoopers returning the respective response with availability to handle the interrupt, and selecting the particular snooper from among the second selection of snoopers.

* * * * *